United States Patent
MacAdam

(10) Patent No.: US 8,014,288 B1
(45) Date of Patent: Sep. 6, 2011

(54) PACKET LATENCY BASED ARBITRATION TECHNIQUE FOR A PACKET SWITCH

(75) Inventor: Angus David Starr MacAdam, Suwanee, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 12/266,377

(22) Filed: Nov. 6, 2008

Related U.S. Application Data

(60) Provisional application No. 61/013,244, filed on Dec. 12, 2007.

(51) Int. Cl.
*H04L 12/417* (2006.01)
*H04L 12/20* (2006.01)
*H04L 12/26* (2006.01)

(52) U.S. Cl. .............. 370/235.1; 370/235; 370/238

(58) Field of Classification Search ............ 370/360, 370/389, 395.5, 235, 235.1, 238
See application file for complete search history.

(56) References Cited

U.S. PATENT DOCUMENTS

| | | | |
|---|---|---|---|
| 4,314,367 A | 2/1982 | Bakka et al. | |
| 5,260,935 A | 11/1993 | Turner | |
| 5,511,070 A | 4/1996 | Lyles | |
| 5,537,400 A * | 7/1996 | Diaz et al. | 370/412 |
| 6,014,690 A | 1/2000 | VanDoren et al. | |
| 6,124,878 A | 9/2000 | Adams et al. | |
| 6,222,848 B1 | 4/2001 | Hayward et al. | |
| 6,249,520 B1 | 6/2001 | Steely et al. | |
| 6,272,127 B1 | 8/2001 | Golden et al. | |
| 7,010,607 B1 | 3/2006 | Bunton | |
| 7,020,133 B2 | 3/2006 | Zhao et al. | |
| 7,145,904 B2 | 12/2006 | Zhao et al. | |
| 7,154,905 B2 | 12/2006 | Shin et al. | |
| 7,155,553 B2 | 12/2006 | Lueck et al. | |
| 7,210,056 B2 | 4/2007 | Sandven et al. | |
| 7,274,701 B2 | 9/2007 | Boduch et al. | |
| 7,304,987 B1 * | 12/2007 | James et al. | 370/360 |
| 7,305,492 B2 | 12/2007 | Bryers et al. | |
| 7,406,086 B2 | 7/2008 | Deneroff et al. | |

(Continued)

OTHER PUBLICATIONS

Xin Li, Latfi Mhamdi, Jung Liu, Konghong Pun, and Mournir Hamdi, "1.3 Buffered Crossbar Switches," High-performance Packet Switching Architectures, pp. 12-13 and 36-37, Springer London, Aug. 30, 2006.

(Continued)

*Primary Examiner* — Dang T Ton
*Assistant Examiner* — Robert M Morlan
(74) *Attorney, Agent, or Firm* — Kenneth Glass; Stanley J. Pawlik; Glass & Associates

(57) ABSTRACT

A packet switch including input ports having various input bandwidths initializes credit values for the input ports. An arbiter of the packet switch selects input ports based on the credit values and routes data packets from the selected input ports to a switch fabric of the packet switch. The switch fabric routes data packets from the selected input ports to output ports of the packet switch. Moreover, the arbiter modifies the credit value of each selected input port based on the latency for routing the data packet from the selected input port to the switch fabric. In this way, the arbiter promotes fairness in routing additional data packets through the packet switch. In some embodiments, the switch fabric includes a buffered crossbar and the arbiter modifies credit values of crosspoints in the buffered crossbar based on the latency for routing data packets from the crosspoints to the output ports.

18 Claims, 16 Drawing Sheets

U.S. PATENT DOCUMENTS

| | | | |
|---|---|---|---|
| 7,436,845 B1 | 10/2008 | Rygh et al. | |
| 7,529,217 B2 | 5/2009 | Pister et al. | |
| 7,602,811 B2 | 10/2009 | Porter et al. | |
| 7,606,151 B2 | 10/2009 | Chilukoor | |
| 7,724,734 B1 | 5/2010 | Grosser et al. | |
| 7,742,486 B2 | 6/2010 | Nielsen et al. | |
| 2001/0033552 A1* | 10/2001 | Barrack et al. | 370/282 |
| 2002/0069271 A1 | 6/2002 | Tindal et al. | |
| 2002/0199205 A1 | 12/2002 | Sonawane et al. | |
| 2003/0107996 A1 | 6/2003 | Black et al. | |
| 2003/0174649 A1* | 9/2003 | Shankar et al. | 370/235 |
| 2004/0017804 A1* | 1/2004 | Vishnu | 370/386 |
| 2004/0103218 A1* | 5/2004 | Blumrich et al. | 709/249 |
| 2004/0151209 A1 | 8/2004 | Cummings et al. | |
| 2005/0207436 A1 | 9/2005 | Varma | |
| 2006/0028987 A1 | 2/2006 | Alexander Gildfind et al. | |
| 2006/0039370 A1 | 2/2006 | Rosen et al. | |
| 2006/0120498 A1 | 6/2006 | Wong et al. | |
| 2006/0221948 A1* | 10/2006 | Benner et al. | 370/389 |
| 2007/0067551 A1 | 3/2007 | Ikeda et al. | |
| 2007/0253439 A1* | 11/2007 | Iny | 370/413 |
| 2008/0165768 A1 | 7/2008 | Shah | |
| 2009/0262732 A1 | 10/2009 | Wood | |

OTHER PUBLICATIONS

Zhen Guo, Roberto Rojas-Cessa, and Nirwan Ansari "Packet Switch with Internally Buffered Crossbars," High-performance Packet Switching Architectures, pp. 121-146, Springer London, Aug. 30, 2006.

Kenji Yoshigoe and Ken Christensen "The Combined Input and Crosspoint Queued Switch," High-performance Packet Switching Architectures, pp. 169-195, Springer London, Aug. 30, 2006.

Xiao Zhang and Laxmi N. Bhuyan, "Deficit Round-Robin Scheduling for Input-Queued Switches" IEEE Journal on Selected Areas in Communications, pp. 584-594, vol. 21, No. 4, May 2003.

M Shreedhar and George Varghese, "Efficient Fair Queuing Using Deficit Round Robin" IEEE/ACM Transactions on Networking, pp. 375-385, vol. 4, No. 3, Jun. 1996.

Kang Xi, Shin'ichi Arakawa, Masayuki Murata, Ning Ge and Chongxi Feng, "Packet-Mode Scheduling with Proportional Fairness for Input-Queued Switches" IEICE Trans. Commun., pp. 4274-4284, vol. E88-B, No. 11 Nov. 2005.

RapidIO Interconnect Specification Part 1: Input/output Logistical Specification, RapidIO Trade Association, Revision 2.0, Mar. 2008.

* cited by examiner

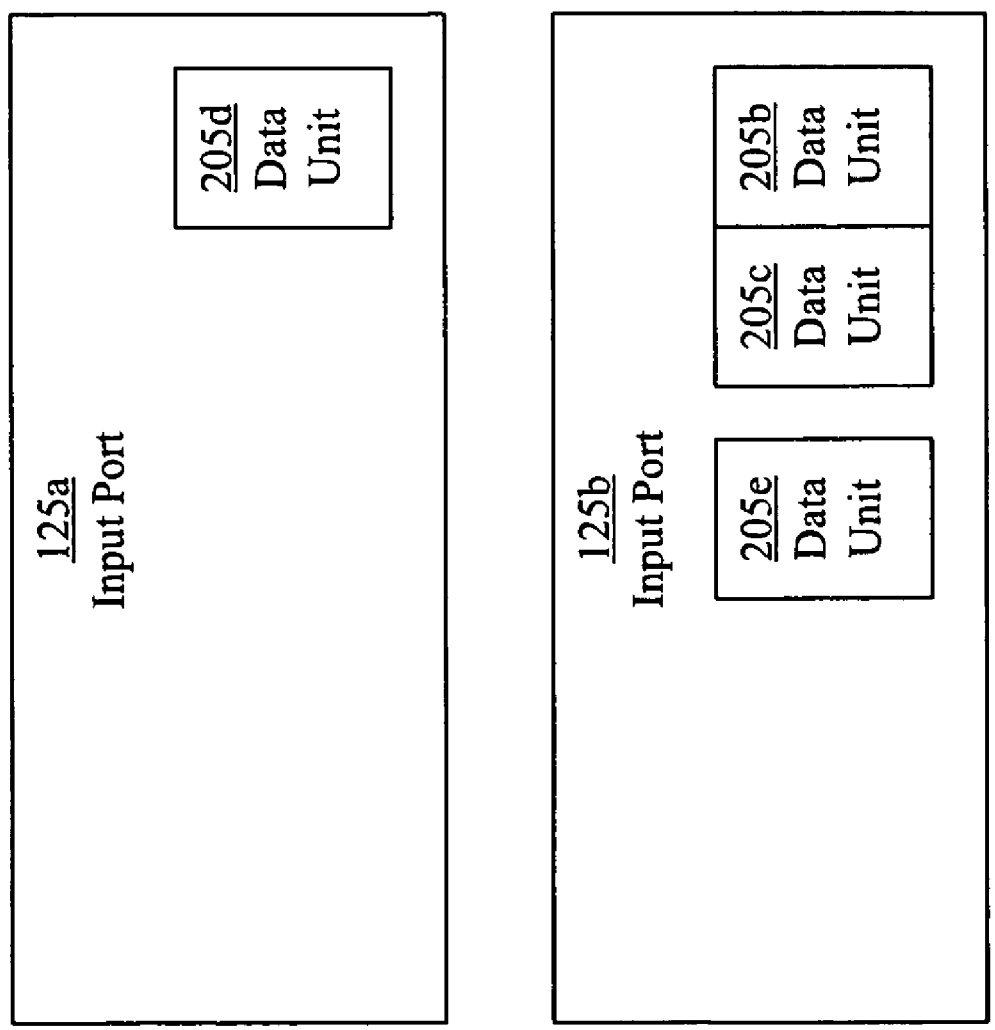

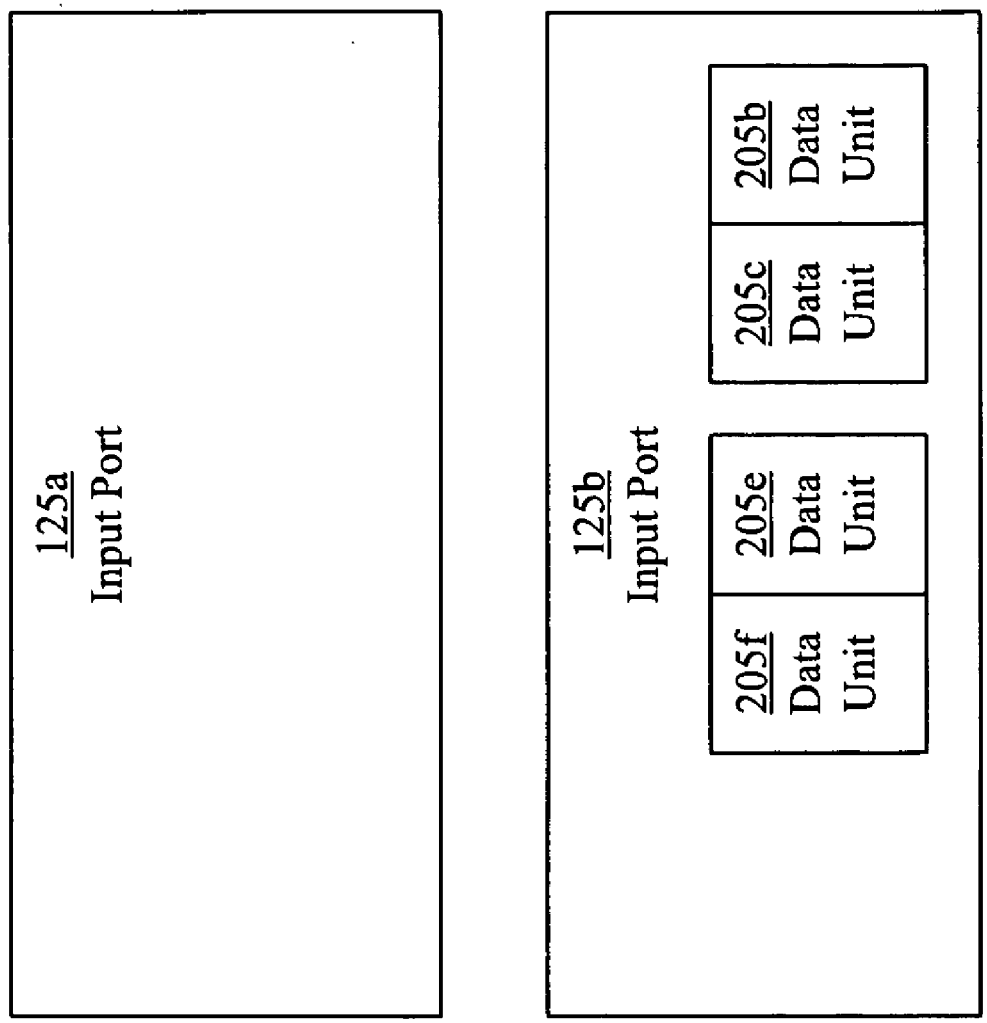

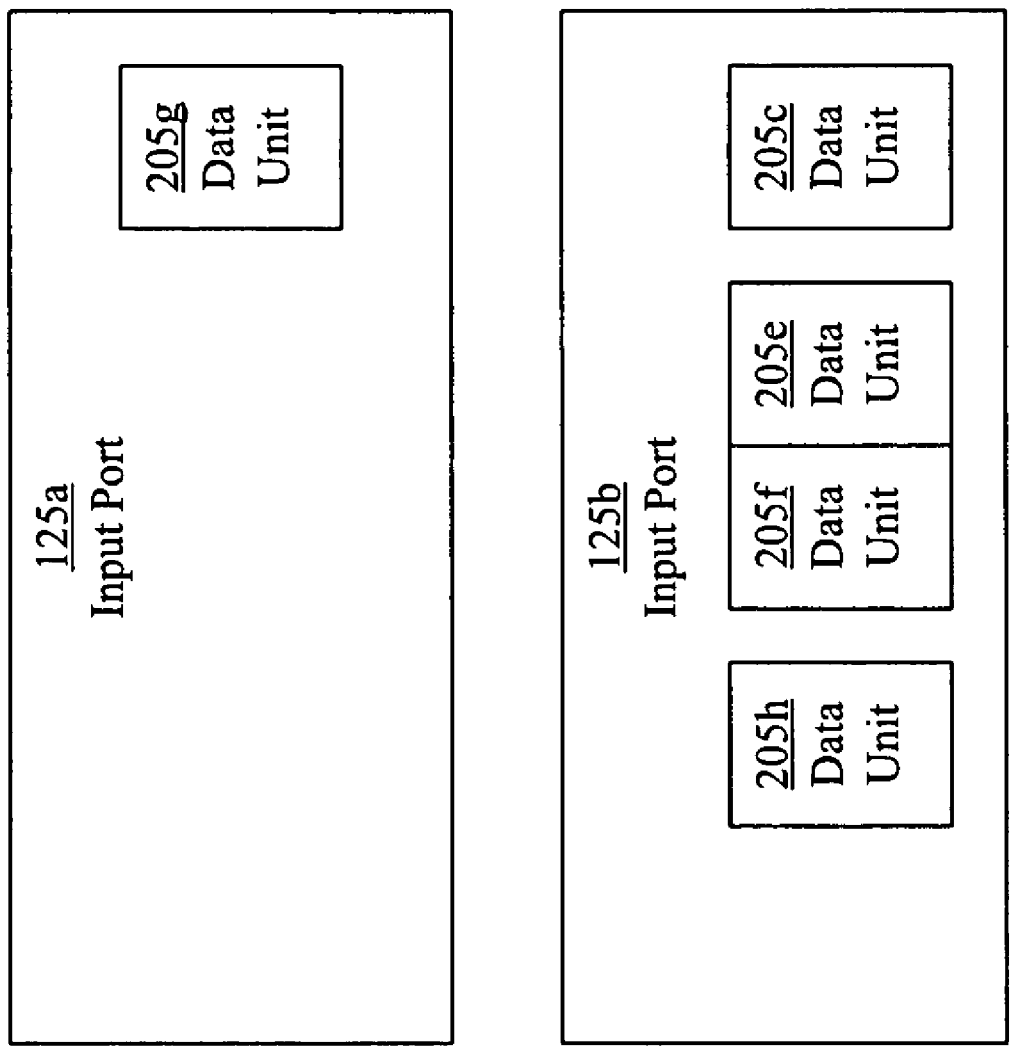

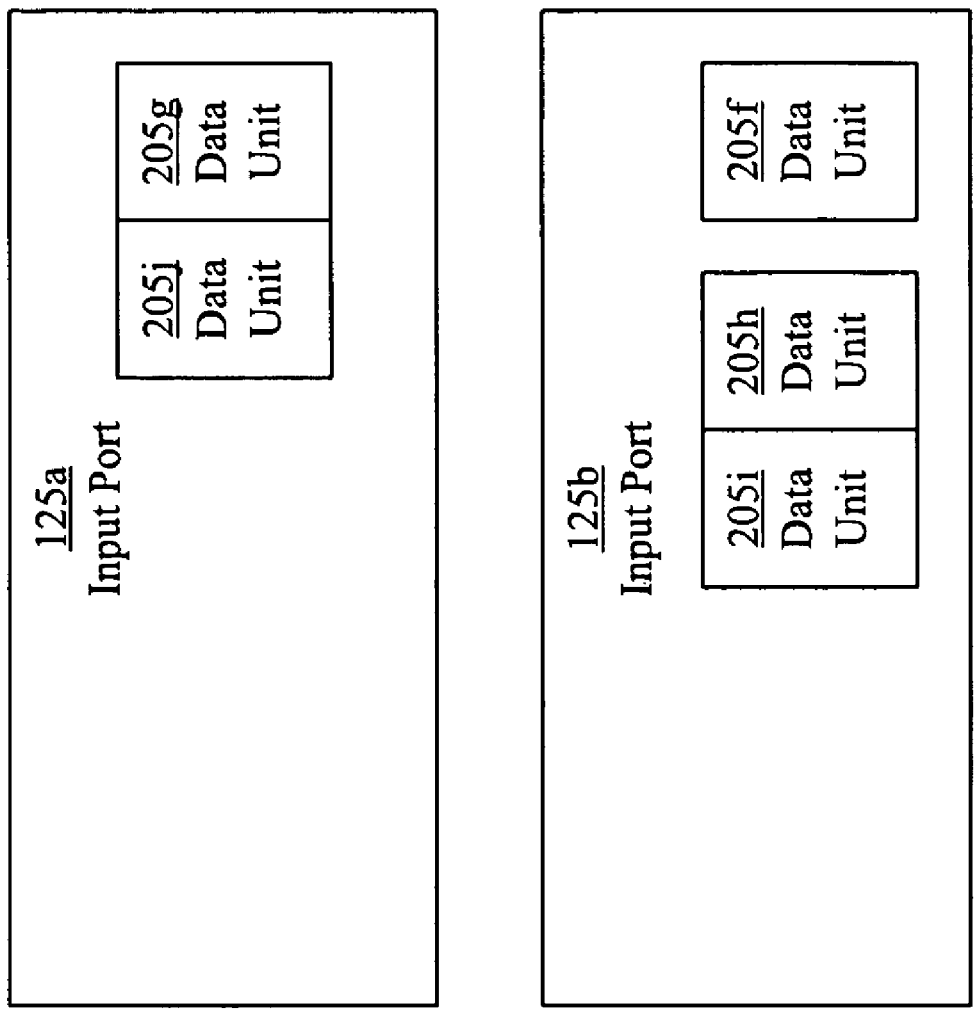

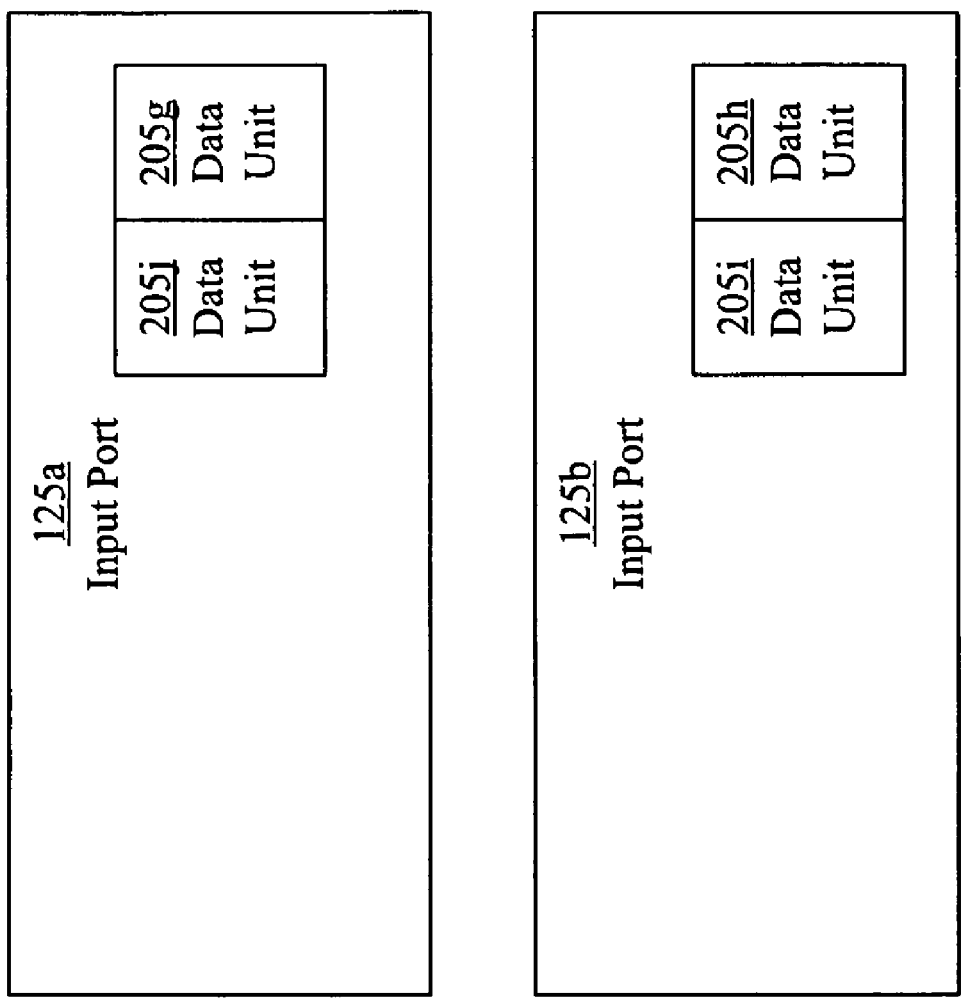

PACKET LATENCY BASED ARBITRATION TECHNIQUE FOR A PACKET SWITCH

CROSS-REFERENCE TO RELATED APPLICATION

The present application claims benefit of U.S. Provisional Application Ser. No. 61/013,244, filed Dec. 12, 2007, entitled "Next-Generation SRIO Switching Devices and Methods," which is incorporated herein by reference in its entirety.

BACKGROUND

A packet-based communication system includes packet switches for routing data packets through a communication network. Each packet switch in the communication network receives data packets at input ports of the packet switch and routes the data packets to output ports of the packet switch. In this way, the data packets are transmitted through the communication network. In some instances, a packet switch in the communication network receives data packets at more than one input port of the packet switch that are to be routed to the same output port of the packet switch. In these instances, an arbiter in the packet switch selects one of the input ports and routes the data packet from the selected input port to the output port. The arbiter repeats this process for the remaining input ports until each of the data packets is routed from a selected input port to the output port.

In one type of arbitration technique employed in a packet switch, the arbiter promotes fairness in selecting input ports of the packet switch by counting the number of data packets routed from each input port to the output ports of the packet switch. In this type of packet switch, a credit value is established for each input port of the packet switch and the arbiter decrements the credit value for each data packet routed from the input port to the output ports of the packet switch. Moreover, the arbiter selects input ports by giving preference to those input ports having higher credit values. In this type of packet switch, the credit values are replenished upon the occurrence of a condition in the packet switch, for example when one of the credit values is decremented to zero.

Although such an arbitration technique has been successful in promoting fairness for routing data packets through a packet in which the input ports have the same input bandwidths, this arbitration technique has been less successful in promoting fairness for routing data packets through a packet switch in which the input ports have various input bandwidths. In particular, the latency for routing a data packet received at an input port having a lower input bandwidth is often greater than the latency for routing a data packet received at an input port having a higher input bandwidth. As a result, the input port having the higher input bandwidth may wait a longer time to be selected by the arbiter than the input port having the lower input bandwidth, which reduces performance of the packet switch by increasing congestion and reducing data packet throughput in the packet switch. Performance is also reduced in the packet switch because the latencies of the data packets routed through the packet switch diverge from an average latency of routing a data packet through the packet switch.

In light of the above, a need exists for increasing performance of a packet switch including input ports having various input bandwidths.

SUMMARY

In various embodiments, a packet switch includes input ports having various input bandwidths. The packet switch initializes a credit value for each of the input ports and includes an arbiter for selecting input ports of the packet switch based on the credit values. Additionally, the packet switch includes a switch fabric that routes data units of data packets received from the selected input ports of the packet switch to output ports of the packet switch. The arbiter modifies the credit value of each selected input port based on the latency for routing a data packet from the selected input port to the switch fabric. The arbiter then selects input ports based on the modified credit values for routing additional data packets through the packet switch. In this way, the arbiter promotes fairness in routing data packets through the packet switch. Additionally, the packet switch replenishes the credit values upon the occurrence of one or more conditions in the packet switch, for example when a credit value reaches a replenishment threshold value.

Because the arbiter promotes fairness in routing data packets through the packet switch based on latencies of data packets routed through the packet switch, variance among the latencies of the data packets is reduced in the packet switch. As a result, performance of the packet switch increases. Additionally, routing congestion decreases and data packet throughput increases in the packet switch.

A packet switch, in accordance with one embodiment, includes input ports having various input bandwidths, output ports, and counters corresponding to the input ports. Each of the input ports has an input bandwidth of the various input bandwidths. The packet switch further includes a switch fabric coupled to the input ports and the output ports, and an arbiter coupled to the input ports and the counters. Each of the input ports is configured to receive a data packet containing data units at the input bandwidth of the input port and identify a destination output port among the output ports for the data packet. The counters are configured to store corresponding credit values for the input ports. The arbiter is configured to select at least one of the input ports based on the credit values. Each selected input port is further configured to route a data packet from the selected input port to the switch fabric. The arbiter is further configured to modify the credit value of each selected input port based on the latency for routing the data packet from the selected input port to the switch fabric. Further, the switch fabric is configured to route each data packet received from a selected input port to the destination output port of the data packet.

A packet switch, in accordance with one embodiment, includes input ports having various input bandwidths, output ports, a switch fabric, counters, and an arbiter. Each of the input ports has an input bandwidth of the various input bandwidths. The switch fabric is coupled to the input ports and the output ports, and the arbiter is coupled to the output ports and the counters. Each of the input ports is configured to receive a data packet containing data units at the input bandwidth of the input port and identify a destination output port among the output ports for the data packet. The switch fabric includes a buffered crossbar having crosspoints and is configured to receive the data packets from the input ports. Moreover, each of the crosspoints is configured to store at least one data unit of a data packet received from an input port. The counters are configured to store corresponding credit values for the crosspoints. The arbiter is configured to select at least one of the crosspoints based on the credit values. Each of the selected crosspoints is further configured to route a data packet from the selected crosspoint to the destination output port of the data packet. The arbiter is further configured to modify the credit value of each selected crosspoint based on the latency for routing the data packet from the selected crosspoint to the destination output port of the data packet.

A method of routing data packets through a packet switch, in accordance with one embodiment, includes receiving data packets containing data units at input ports of a packet switch having various input bandwidths. Each of the input ports has an input bandwidth of the various input bandwidths. The method also includes identifying a destination in the packet switch for each of the data packets and storing a data unit of each data packet in a corresponding storage location in the packet switch. Further, the method includes storing credit values corresponding to the storage locations and selecting at least one of the storage locations based on the credit values. Additionally, the method includes routing a data packet from each selected storage location to the destination of the data packet and modifying the credit value of each selected storage location based on the latency for routing the data packet from the selected storage location to the destination of the data packet.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIGS. 5A-H are block diagrams of data units of data packets in input ports of a packet switch, in accordance with an embodiment of the present invention.

DETAILED DESCRIPTION

In various embodiments, a packet switch includes input ports having various input bandwidths for receiving data packets. The packet switch initializes credit values for the input ports and identifies destination output ports of the packet switch for data packets received by the input ports. An arbiter of the packet switch selects input ports for routing data packets through the packet switch based on the credit values. A switch fabric of the packet switch routes data packets from the select input ports to the destination output ports of the data packets. Moreover, the arbiter modifies the credit value of each selected input port based on the latency for routing a data packet from the selected input port to the switch fabric. The arbiter then selects input ports based on the modified credit values for routing additional data packets through the packet switch. In this way, the arbiter promotes fairness in routing data packets through the packet switch. The packet switch replenishes the credit values upon the occurrence of a condition, for example when a credit value reaches a replenishment threshold value.

In some embodiments, the arbiter modifies the credit value of each selected input port by decrementing the credit value by the number of clock cycles of a clock signal in which the switch fabric receives data units of a data packet from the selected input port. Further, the arbiter selects input ports to minimize variance among the credit values, which reduces variance among latencies of data packets routed through the packet switch. As a result, routing congestion decreases and data packet throughput increases in the packet switch.

Figure 1:
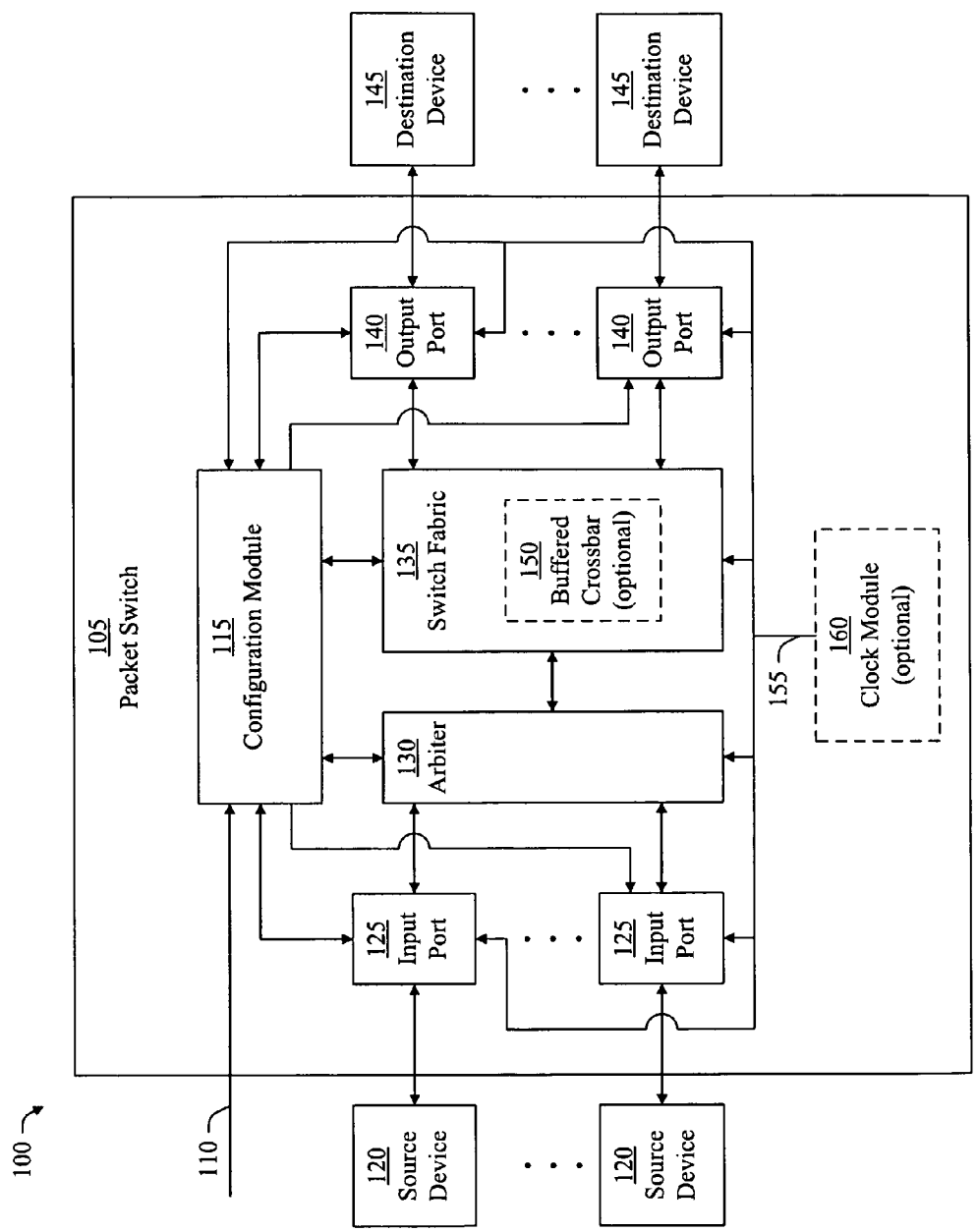
FIG. 1 is a block diagram of a communication system, in accordance with an embodiment of the present invention.

FIG. 1 illustrates a communication system 100, in accordance with an embodiment of the present invention. The communication system 100 includes a packet switch 105, source devices 120, and destination devices 145. The source devices 120 send data packets to the packet switch 105 and the packet switch 105 routes the data packets to destination devices 145 based on the data packets. In some embodiments, the packet switch 105 is implemented in a single semiconductor die. In other embodiments, the packet switch 105 is implemented in multiple semiconductor die and contained in a chip package. For example, the packet switch 105 may be contained in a multichip package.

In various embodiments, the packet switch 105 routes a data packet received from a source device 120 to a destination device 145 by using a cut-through routing technique. In the cut-through routing technique, the packet switch 105 routes a data packet through the packet switch 105 by routing portions (e.g., data units) of the data packet through the packet switch 105. In this way, the packet switch 105 may begin to route a data packet through the packet switch 105 when the packet switch 105 receives a first portion of the data packet and completes routing the data packet by routing a last portion of the data packet.

In some embodiments, the packet switch 105 is substantially compliant with (e.g., substantially conforms to) a serial RapidIO (sRIO) standard. In these embodiments, the packet switch 105 receives data packets compliant with the sRIO standard from the source devices 120, routes the data packets through the packet switch 105 substantially in conformance with the sRIO standard, and sends data packets compliant with the sRIO standard to the destination devices 145.

In various embodiments, the packet switch 105 includes a configuration module 115, input ports 125, an arbiter 130, a switch fabric 135, and output ports 140. The input ports 125 correspond to the source devices 120 and each input port 125 is coupled (e.g., connected) to the corresponding source device 120. The output ports 140 correspond to the destination devices 145 and each output port 140 is coupled (e.g., connected) to the corresponding destination device 145. Additionally, the input ports 125 are coupled (e.g., connected) to configuration module 115, the arbiter 130, and the switch fabric 135. For example, the switch fabric 135 may be directly connected to the input ports 125 or coupled to the input ports 125 through the arbiter 130. Further, the switch fabric 135 is coupled (e.g., connected) to the arbiter 130, the configuration module 115, and the output ports 140. In some embodiments, the arbiter 130 is also coupled to the output ports 140.

Each of the configuration module 115, the input ports 125, the arbiter 130, the switch fabric 135, and the output ports 140 receives a clock signal 155 for synchronizing operation of the packet switch 105. In some embodiments, the packet switch 105 receives the clock signal 155 from a clock signal source external of the packet switch 105. In other embodiments, the packet switch 105 includes an optional clock module 160 for generating the clock signal 155.

In operation, the input ports 125 receive data packets, or portions of data packets (e.g., data units), from the source devices 120 corresponding to the input ports 125. Each input port 125 receiving a data packet, or portion of a data packet, stores at least a portion of the data packet in a storage location of the input port 125. Additionally, the input port 125 identifies an output port 140 (e.g., a destination output port 140) for the data packet. The arbiter 130 selects input ports 125 such that a data packet, or a portion of the data packet, may be contemporaneously routed from each selected input port 125 to the output port 140 identified for the data packet, as is described more fully herein. The switch fabric 135 contemporaneously routes data packets, or portions of data packets, from the selected input ports 125 to the output ports 140, based on the contents of the data packets. In turn, each output port 140 receiving a data packet, or a portion of the data packet, from a selected input port 125 through the switch fabric 135 outputs the data packet, or the portion of the data packet, to the corresponding destination device 145 coupled to the output port 140.

The configuration module 115 configures (e.g., programs) operation of the packet switch 105, for example based on information received from a user through a communication channel 110. In various embodiments, the configuration module 115 configures each input port 125 to identify output ports 140 (e.g., destination output ports) for data packets received by the input port 125 based on the data packets. For example, an input port 125 may identify a destination output port 140 for a data packet received by the input port 125 based on a header of the data packet. In some embodiments, the configuration module 115 maintains a route table for each input port 125 for mapping a destination address of a data packet received by the input port 125 to a port identifier identifying an output port 140 in the packet switch 105. In these embodiments, the input port 125 identifies a port identifier of a data packet from the route table based on the destination address of the data packet. Further, the input port 125 provides the port identifier along with the data packet to the switch fabric 135 and the switch fabric 135 routes the data packet to the output port 140 identified by the port identifier (e.g., a destination output port).

In various embodiments, the configuration module 115 selects input bandwidths of the input ports 125 and configures each input port 125 to receive data packets at the input bandwidth selected for the input port 125. In this way, the input ports 125 may have various input bandwidths and the input bandwidth of an input port 125 may be selected to match the output bandwidth of the corresponding source device 120 coupled to the input port 125. Further, each input port 125 of the packet switch 105 has an internal bandwidth (e.g., an output bandwidth) at which the input port 125 sends data packets to the switch fabric 135.

In some embodiments, the configuration module 115 selects output bandwidths of the output ports 140 and configures each output port 140 to output data packets from the packet switch 105 at the output bandwidth selected for the output port 140. In this way, the output ports 140 may have various output bandwidths and the output bandwidth of an output port 140 may be selected to match the input bandwidth of the corresponding destination device 145 coupled to the output port 140. Further, each output port 140 of the packet switch 105 has an internal bandwidth (e.g., an input bandwidth) at which the output port 140 receives data packets from the switch fabric 135.

In some embodiments an input port 125 and an output port 140 are coupled to a device external of the packet switch 105 which functions as both a source device 120 and a destination device 145. For example, the device may be a bidirectional device capable of sending data packets to the input port 125 and receiving data packets from the output port 140. In these embodiments, the input bandwidth of the input port 125 is the same as the output bandwidth of the output port 140. In further embodiments, the configuration module 115 may select a bandwidth for the input port 125 and the output port 140 which serves as both the input bandwidth of the input port 125 and the output bandwidth of the output port 140.

In various embodiments, the internal bandwidth (e.g., output bandwidth) of each input port 125 in the packet switch 105 is greater than the input bandwidth of the input port 125. In this way, data overflow is inhibited (e.g., prevented) from occurring in each of the input ports 125. For example, each input port 125 of the packet switch 105 may have an internal bandwidth of ten gigabits per second (10 Gb/s) and each of the input ports 125 may be individually configured to have an input bandwidth selected from a number of predetermined bandwidths including two gigabits per second (2 Gb/s), two-and-a-half gigabits per second (2.5 Gb/s), four gigabits per second (4 Gb/s), and eight gigabits per second (8 Gb/s).

In various embodiments, the arbiter 130 is distributed among the input ports 125, the switch fabric 135, and the output ports 140. In these embodiments, the input ports 125 communicate with the switch fabric 135 to perform arbitration for the input ports 125, and the switch fabric 135 communicates with the output ports 140 to perform arbitration for the output ports 140. In this way, the functionality of the arbiter 130 is distributed among the input ports 125, the switch fabric 135, and the output ports 140 of the packet switch 105.

In further embodiments, the switch fabric 135 includes an optional buffered crossbar 150. In these embodiments, the arbiter 130 is distributed among the input ports 125, the switch fabric 135, and the output ports 140. The arbiter 130 performs arbitration on the input ports 125 to select an input port 125 containing a data unit of a data packet based on the capacity of the buffered crossbar 150 to accept the data unit of the data packet from the input port 125. For example, the arbiter 130 may perform arbitration on the input ports 125 based on a round robin algorithm. Additionally, the arbiter 130 performs arbitration on the output ports 140 to select an output port 140 based on the capacity of the output port 140 to accept a data unit of a data packet from the buffered crossbar 150. For example, the arbiter 130 may perform arbitration on the output ports 140 by using a credit based arbitration algorithm, such as a proportional fairness algorithm.

Figure 2:
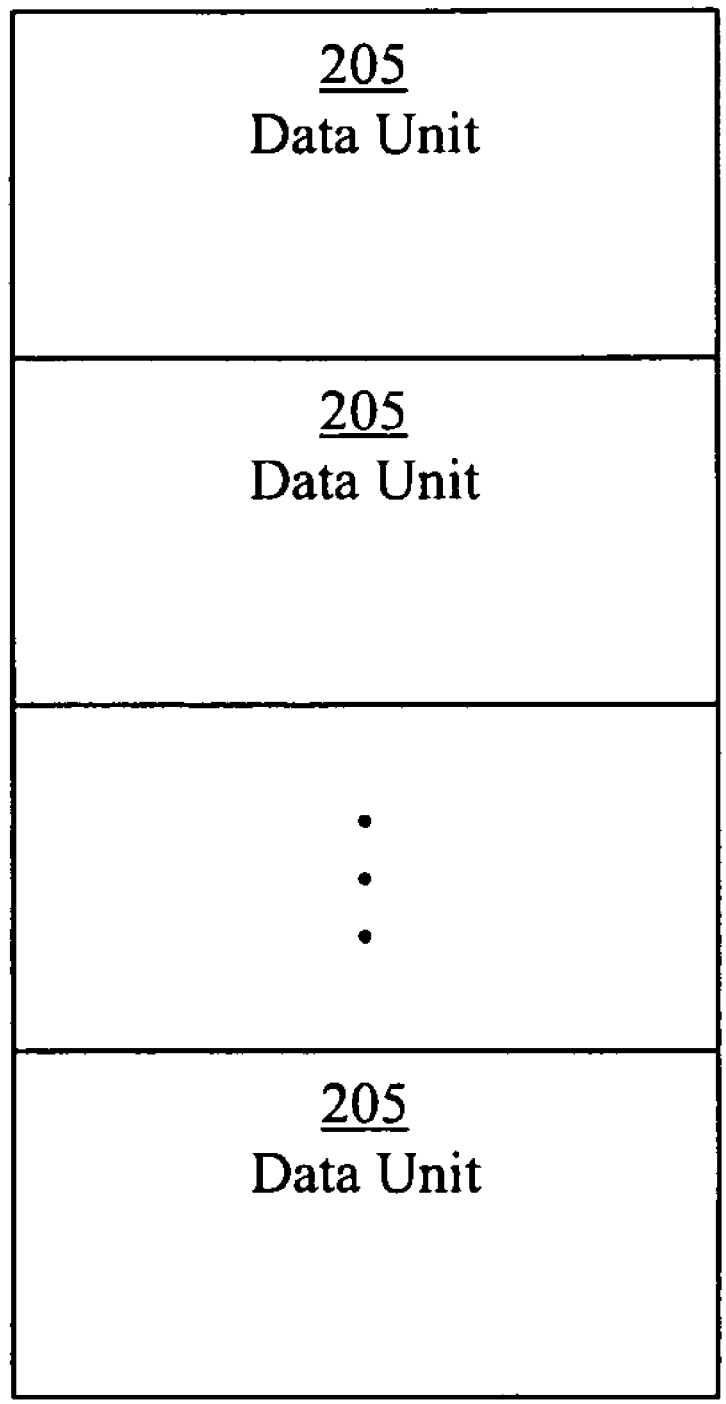
FIG. 2 is a block diagram of data packet, in accordance with an embodiment of the present invention.

FIG. 2 illustrates a data packet 200, in accordance with an embodiment of the present invention. The data packet 200 includes data units 205, each of which contains data of the data packet 200 (e.g., a portion of the data packet 200). The data unit 205 may be any unit of data, such as a data bit, a data byte, a data word, or the like. The data packet 200 has a size which depends upon the number of data units 205 in the data packet 200 and the size of each data unit 205 in the data packet 200.

In some embodiments, the data packet 200 has a fixed size (e.g., a predetermined size). In other embodiments, the data packet 200 has a variable size. In some embodiments, each of the data units 205 of the data packet 200 has a fixed size (e.g., a predetermined size). In other embodiments, the data units 205 of the data packet 200 have variable sizes. In various embodiments, the data packet 200 may include any number of data units 205. For example, the data packet 200 may include a number of data units 205 in a predetermined range of data units 205. As another example, the data packet 200 may include a single data unit 205.

In various embodiments, the packet switch 105 receives a data packet 200 by receiving each data unit 205 of the data packet 200. Further, the packet switch 105 routes the data packet 200 through the packet switch 105 by individually routing each data unit 205 of the data packet 200 through the packet switch 105. In this way, the packet switch 105 may receive a data unit 205 of a data packet 200 and route the data unit 205 through the packet switch 105 before receiving each of the data units 205 of the data packet 200. Moreover, the packet switch 105 routes the data packet 200 through the packet switch 105 as an atomic unit (e.g., an uninterrupted stream of data units of a data packet). In this process, an input port 125 selected by the arbiter 130 provides the data units 205 of the data packet 200 to the switch fabric 135 in sequence without providing a data unit 205 of another data packet 200 to the switch fabric 135 between any two data units 205 in the sequence.

Figure 3:
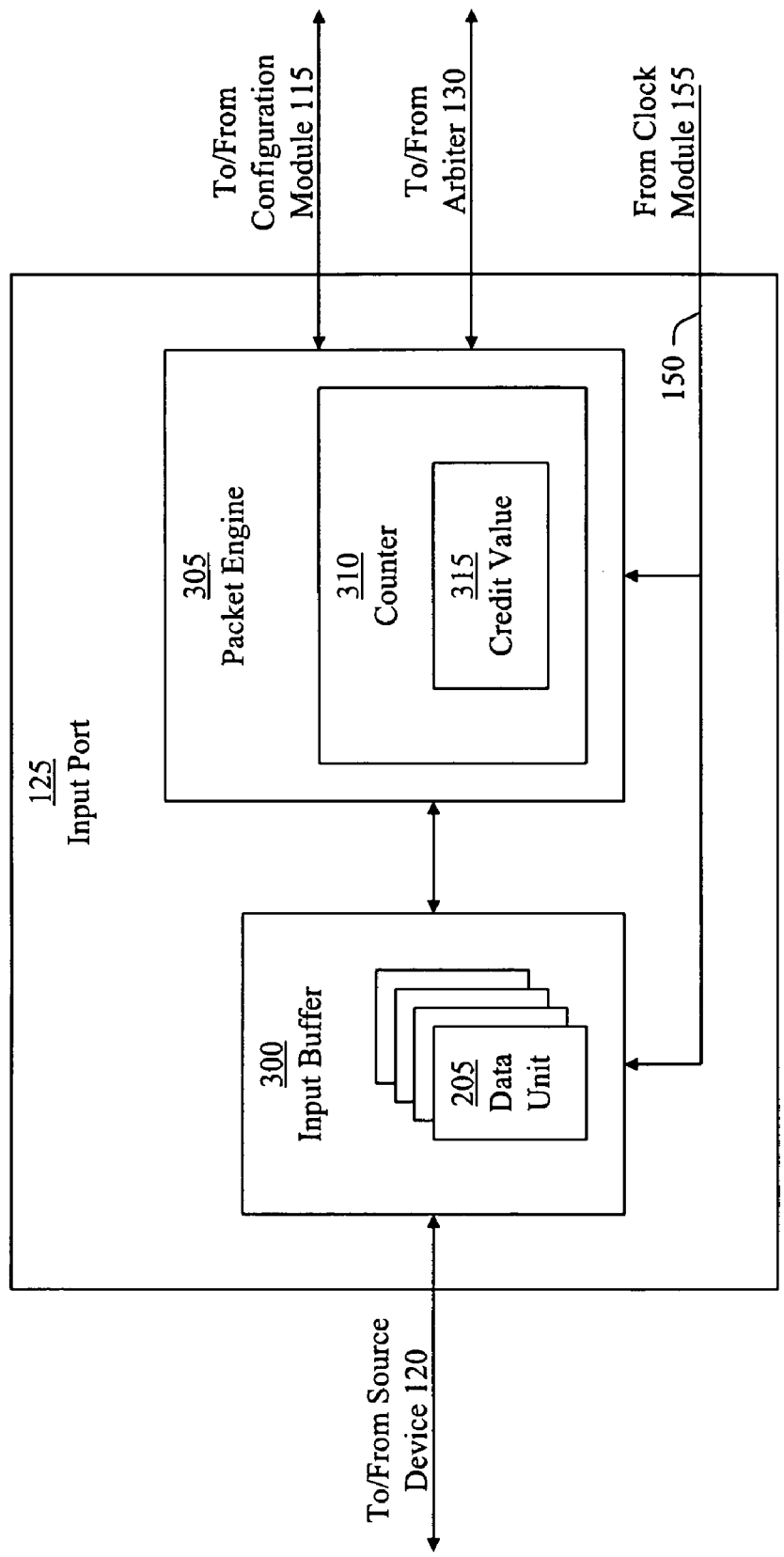
FIG. 3 is a block diagram of an input port of a packet switch, in accordance with an embodiment of the present invention.

FIG. 3 illustrates the input port 125, in accordance with an embodiment of the present invention. The input port 125 includes an input buffer 300 and a packet engine 305 coupled (e.g., connected) to the input buffer 300. The input port 125 receives data units 205 of data packets 200 from the source device 120 corresponding to the input port 125 and writes data units 205 of the data packets 200 into the input buffer 300. In turn, the input buffer 300 stores the data units 205. In this way, the input buffer 300 is a storage location for the data units 205 in the input port 125. The input buffer 300 has a storage capacity to store at least one data unit 205 of a data packet 200 received by the input port 125. In some embodiments, the input buffer 300 has a storage capacity to store each data unit 205 of a data packet 200 received by the input port 125 from the source device 120 corresponding to the input port 125. In further embodiments, the input buffer 300 has storage capacity to store each data unit 205 of more than one data packet 200 received by the input port 125 from the source device 120 corresponding to the input port 125.

In various embodiments, the packet engine 305 includes a counter 310 for storing a credit value 315 for the input port 125. For example, the counter 310 may be a register or a storage location of a memory device for storing a credit value 315. As another example, the counter 310 may include a register for storing a credit value 315 and logic for performing arithmetic operations, such as additions and subtractions, on the credit value 315 stored in the register. The packet engine 305 initializes the counter 310 to an initial credit value 315, for example upon reset or power up of the packet switch 105. In operation, the input port 125 receives a data packet 200 by receiving the first data unit 205 of the data packet 200 and the input buffer 300 stores the first data unit 205. The packet engine 305 identifies a destination output port 140 for the data packet 200 based on the first data unit 205 and provides a port identifier identifying the destination output port 140 to the arbiter 130. In turn, the arbiter 130 selects the input port 125 in an arbitration cycle for routing the data packet 200 through the switch fabric 135 to the destination output port 140 identified by the port identifier.

The packet engine 305 of the input port 125 provides (e.g., routes) each data unit 205 of the data packet 200 to the switch fabric 135. In turn, the switch fabric 135 routes each data unit 205 of the data packet 200 to the destination output port 140 identified by the port identifier. In various embodiments, the packet engine 305 provides the data packet 200 to the switch fabric 135 as an atomic unit. Moreover, the packet engine 305 may provide the data packet 200 to the switch fabric 135 by using the cut-through technique as described more fully herein.

The arbiter 130 modifies the credit value 315 stored in the counter 310 based on the latency for providing (e.g., routing) each data unit 205 of the data packet 200 from the input port 125 to the switch fabric 135. For example, the arbiter 130 may decrement the credit value 315 stored in the counter 310 by a value representing the latency for routing the data packet 200 from the input port 125 to the switch fabric 135 (e.g., the latency for sending the data packet 200 from the input port 125 to the switch fabric 135).

In various embodiments, the input port 125 provides the data units 205 of the data packet 200 to the switch fabric 135 in a time period spanning a number of clock cycles of the clock signal 155. In these embodiments, the number of clock cycles of the clock signal 155 in the time period is deemed the latency for routing the data units 205 of the data packet 200 from the input port 125 to the switch fabric 135. Moreover, arbiter 130 decrements the credit value 315 stored in the counter 310 by the number of clock cycles of the clock signal 155 for routing the data units 205 of the data packet 200 from the input port 125 to the switch fabric 135. Because the arbiter 130 determines (e.g., measures) the latency of the data packet 200 based on the number of clock cycles of the clock signal 155 for routing the data units 205 of the data packet 200 from the input port 125 to the switch fabric 135, a time stamp is not needed for indicating how long the data packet 200, or a data unit 205 of the data packet 200, is stored in the input port 125. As a result, size and complexity of logic circuits for determining (e.g., measuring) latencies of data packets 200 are reduced in the packet switch 105.

In one embodiment, the arbiter 130 provides a first control signal to the counter 310 of the input port 125 when the switch fabric 135 receives the first data unit 205 of the data packet 200 from the input port 125. Further, the arbiter 130 provides a second control signal to the counter 310 of the input port 125 when the switch fabric 135 receives the last data unit 205 of the data packet 200 from the input port 125. In response to the first control signal, the counter 310 decrements the credit value 315 stored in the counter 310 in each subsequent clock cycle of the clock signal 155 until the counter 310 receives the second control signal from the arbiter 130. In this way, the arbiter 130 decrements the counter 310 by the latency of routing the data units 205 of the data packet 200 from the input port 125 to the switch fabric 135. In another embodiment, the arbiter 130 provides the first control signal to the counter 310 of the input port 125 when the arbiter 130 selects the input port 125 instead of when the switch fabric 135 receives the first data unit 205 of the data packet 200 from the input port 125.

In various embodiments, the arbiter 130 selects more than one input port 125 in an arbitration cycle such that the switch fabric 135 is capable of receiving a data unit 205 of a data packet 200 from each selected input port 125 and routing a data unit 205 of each data packet 200 received from the selected input ports 125 to the destination output port 140 of the data packet 200 in an arbitration cycle. In turn, the switch fabric 135 routes each data unit 205 received from each selected input port 125 in an arbitration cycle. In this way, the switch fabric 135 contemporaneously routes a data unit 205 of each data packet 200 received from the selected input ports 125 to the destination output port 140 of the data packet 200 containing the data unit 205.

In various embodiments, the arbiter 130 selects one or more input ports 125, each of which contains at least one data unit 205 of a data packet 200, by giving preference to an input port 125 having a higher credit value 315 over an input port 125 having a lower credit value 315. For example, the arbiter 130 may select one or more input ports 125 in an arbitration cycle. Further, the arbiter 130 decrements the selected input port 125 having the higher credit value 315 by the latency for routing each data unit 205 of the data packet 200 from the selected input port 125 to the switch fabric 135. In this way, the arbiter 130 minimizes variance among the credit values 315 of the input ports 125 in the packet switch 105.

In some embodiments, the arbiter 130 may decrement the credit value 315 stored in a counter 310 so that the credit value 315 is negative. In these embodiments, the arbiter 130 selects input ports 125 by giving preference to any input port 125 containing a data unit 205 of a data packet 200 and having a nonnegative credit value 315 (e.g., a credit value equal to, or greater, than zero). For example, the arbiter 130 may use a hierarchical round robin algorithm for selecting input ports 125 by first selecting among any input ports 125 containing at least one data unit 205 of a data packet 200 and having a nonnegative credit value 315 and then selecting among any remaining input ports 125 containing at least one data unit 205 of a data packet 200 and having a negative credit value 315. In this way, the arbiter 130 gives preference to selecting input ports 125 containing at least one data unit 205 of a data packet 200 and having nonnegative credit values 315 (e.g., a value equal to, or greater than, zero). In a further embodiment, the arbiter 130 gives preference to selecting input ports 125 having higher credit values 315 when selecting input ports 125 containing at least one data unit 205 of a data packet 200 and having a nonnegative credit value 315 and again when selecting among any remaining input ports 125 containing at least one data unit 205 of a data packet 200 and having a negative credit value 315.

In some embodiments, the packet engine 305 of an input port 125 may perform some or all of the functions of the arbiter 130 described herein. In some embodiments, arbiter 130 may perform some or all of the functions of the packet engine 305 of an input port 125 described herein. For example, the arbiter 130 may initialize the counter 310 of an input port 125 and the packet engine 305 may decrement the counter 310 of the input port 125. In some embodiments, the counter 310 of an input port 125 is external of the packet engine 305 of the input port 125. In some embodiments, the counter 310 of an input port 125 is external of the input port 125. For example, the arbiter 130 may contain the counters 310 corresponding to the input ports 125.

In various embodiments, the arbiter 130 selects one or more input ports 125 in an arbitration cycle based on the credit values 315 of the input ports 125 and the capacity of the output ports 140 to accept data units 205. In this selection process, the arbiter 130 gives preference to an input port 125 containing at least one data unit 205 of a data packet 200 and having a nonnegative credit value 315, if any, in a first phase of the arbitration cycle. For example, the arbiter 130 may use a scheduling algorithm, such as a round robin algorithm, to select an input port 125 containing at least one data unit 205 of a data packet 200 and having a nonnegative credit value 315 in the first phase of the arbitration cycle. In a second phase of the arbitration cycle, the arbiter 130 may select one or more input ports 125 each of which contains at least one data unit 205 of a data packet 200 and has a negative credit value 315. For example, the arbiter 130 may use a scheduling algorithm, such as a round robin algorithm, to select an input port 125 containing at least one data unit 205 of a data packet 200 and having a negative credit value 315 in the second phase of the arbitration cycle.

In some embodiments, the arbiter 130 uses a hierarchical round robin algorithm to promote fairness in selecting input ports 125. In these embodiments, the arbiter 130 uses a round robin algorithm in the first phase of the arbitration cycle to select input ports 125 containing at least one data unit 205 of a data packet 200 and having nonnegative credit values 315. Additionally, the arbiter 130 uses another round robin algorithm in the second phase of the arbitration cycle to select input ports 125 containing at least one data unit 205 of a data packet 200 and having negative credit values 315. Further, the arbiter 130 maintains a pointer to the last input port 125 selected by the arbiter 130 in either the first phase or the second phase of the arbitration cycle and uses the pointer to select the next input port 125 in both the first phase and the second phase of a subsequent arbitration cycle. In this way, the arbiter 130 gives preference to selecting input ports 125 in the first phase of the arbitration cycle over selecting input ports 125 in the second phase of the arbitration cycle and promotes fairness in selecting input ports 125 in the arbitration cycle.

In various embodiments, the arbiter 130 maintains a pointer to a selected input port 125 until each data unit 205 of a data packet 200 is routed from the selected input port 125 to the switch fabric 135. In this way, the switch fabric 135 routes the data packet 200 to the destination output port 140 of the data packet 200 as an atomic unit. For example, the arbiter 130 may select an input port 125 in an arbitration cycle and maintain a pointer to the selected input port 125 so that the selected input port 125 remains selected in one or more subsequent arbitration cycles until the switch fabric 135 receives each data unit 205 of a data packet 200 from the selected input port 125.

In various embodiments, the arbiter 130 replenishes the credit values 315 of the input ports 125 when a replenishment condition occurs. In one embodiment, a replenishment condition occurs when one of the credit values 315 is decremented to a replenishment threshold value. For example, the replenishment threshold value may be zero. In another embodiment, a replenishment condition occurs when each of the credit values 315 is decremented to a replenishment threshold value. In some embodiments, the arbiter 130 replenishes the credit values 315 of the input ports 125 by storing the initial credit value 315 into the counters 310 of the input ports 125 when a replenishment condition occurs. In other embodiments, the arbiter 130 replenishes the credit values 315 of the input ports 125 by adding a replenishment value to each of the credit values 315 stored in the counters 310.

Figure 4:
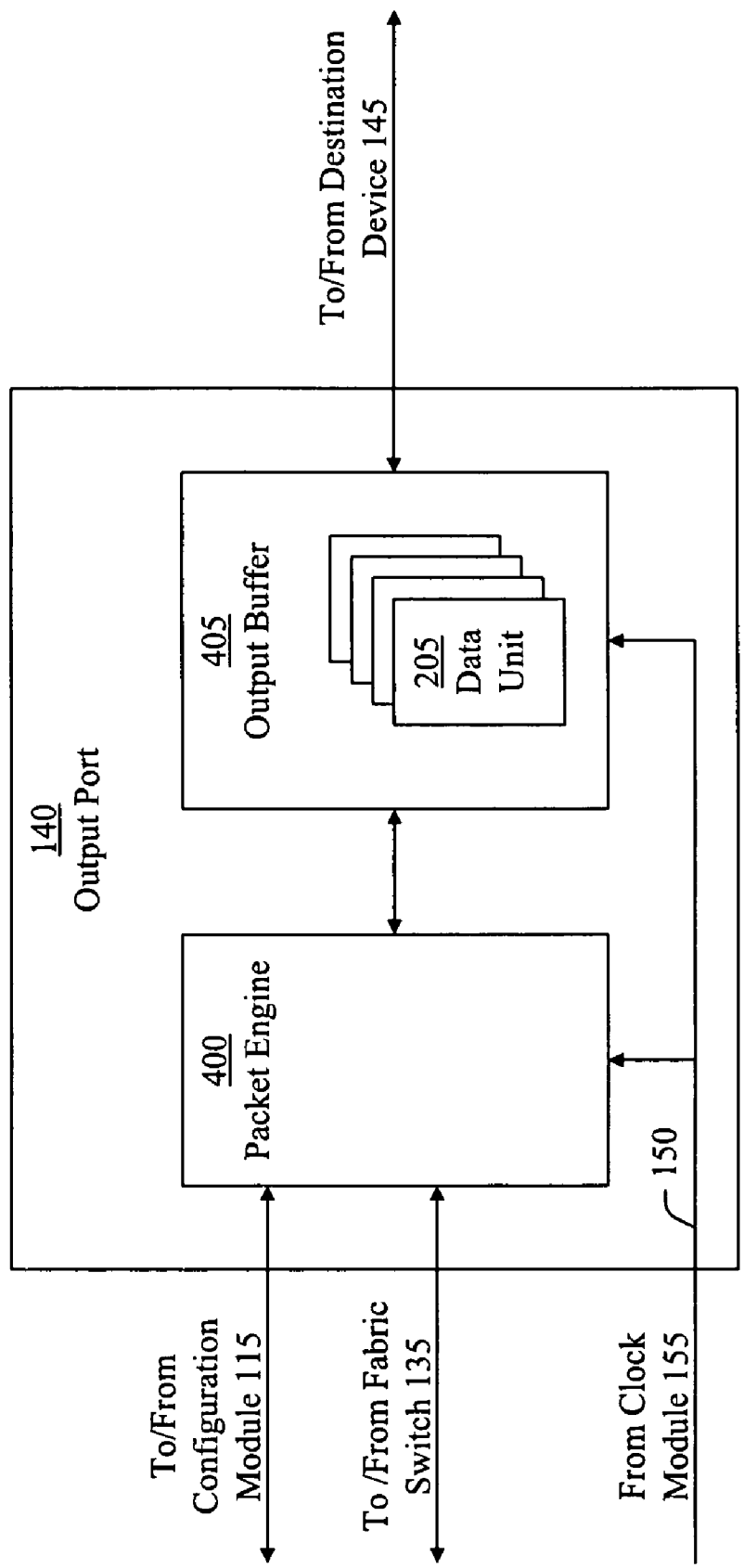
FIG. 4 is a block diagram of an output port of a packet switch, in accordance with an embodiment of the present invention.

FIG. 4 illustrates the output port 140, in accordance with an embodiment of the present invention. The output port 140 includes a packet engine 400 and an output buffer 405 coupled (e.g., connected) to the packet engine 400. The output buffer 405 has a storage capacity to store at least one data unit 205 of a data packet 200 received by the output port 140 from the switch fabric 135. In some embodiments, the output buffer 405 has a storage capacity to store each data unit 205 of a data packet 200 received by the output port 140 from the switch fabric 135. In further embodiments, the output buffer 405 has storage capacity to store each data unit 205 of more than one data packet 200 received by the output port 140 from the switch fabric 135. In some embodiments, the packet engine 400 and the output buffer 405 receive the clock signal 155 for synchronizing operation of the output port 140 based on the clock signal 155.

The packet engine 400 receives data units 205 of a data packet 200 from the switch fabric 135 and writes the data units 205 of the data packet 200 into the output buffer 405. In turn, the output buffer 405 stores the data units 205 of the data packet 200 and outputs the data units 205 of the data packet 200 from the packet switch 105 to the destination device 145 corresponding to the output port 140.

In various embodiments, the output port 140 outputs the data units 205 of a data packet 200 received by the output port 140 contiguously to the destination device 145 corresponding to the output port 140 in the order in which the output port 140 received the data units 205. Moreover, the output port 140 outputs each data unit 205 of the data packet 200 to the destination device 145 in the order in which the input port 125 sent the data units 205 to the switch fabric 135. In this way, the output port 140 outputs the data units 205 of the data packet 200 to the destination device 145 in sequence without outputting a data unit 205 of another data packet 200 to the destination device 145 between any two data units 205 in the sequence. In some embodiments, the output port 140 outputs an idle symbol between data units 205 in the sequence if the output buffer 405 does not contain a data unit 205 of the data packet 200 in a clock cycle of the clock signal 155. In this way, the output port 140 need not store each data unit 205 of the data packet 200 before outputting a data unit 205 of the data packet 200 from the packet switch 105.

In various embodiments, the arbiter 130 is distributed among the input ports 125, the switch fabric 135, and the output ports 140. For example, the packet engines 305 in the input ports 125, the switch fabric 135, and the packet engines 400 in the output ports 140 may include a portion of logic of the arbiter 130. In these embodiments, the input ports 125 communicate with the switch fabric 135 to perform arbitration for the input ports 125, and the switch fabric 135 communicates with the output ports 140 to perform arbitration for the output ports 140. In this way, the functionality of the arbiter 130 is distributed among the input ports 125, the switch fabric 135, and the output ports 140 of the packet switch 105.

FIGS. 5A-H illustrate data units 205 of data packets 200 in input ports 125 of the packet switch 105, in accordance with an embodiment of the present invention. The input ports 125 include exemplary input ports 125a and 125b, and the data units 205 include exemplary data units 205a-j. Moreover, each of the input ports 125 has the same credit value 315 stored in the counter 310 corresponding to the input port 125. In this exemplary embodiment, the input bandwidth of the input port 125b is twice the input bandwidth of the input port 125a. As a result, the input port 125b may receive twice as many data units 205 as the input port 125a in a given time period.

Figure 5A:
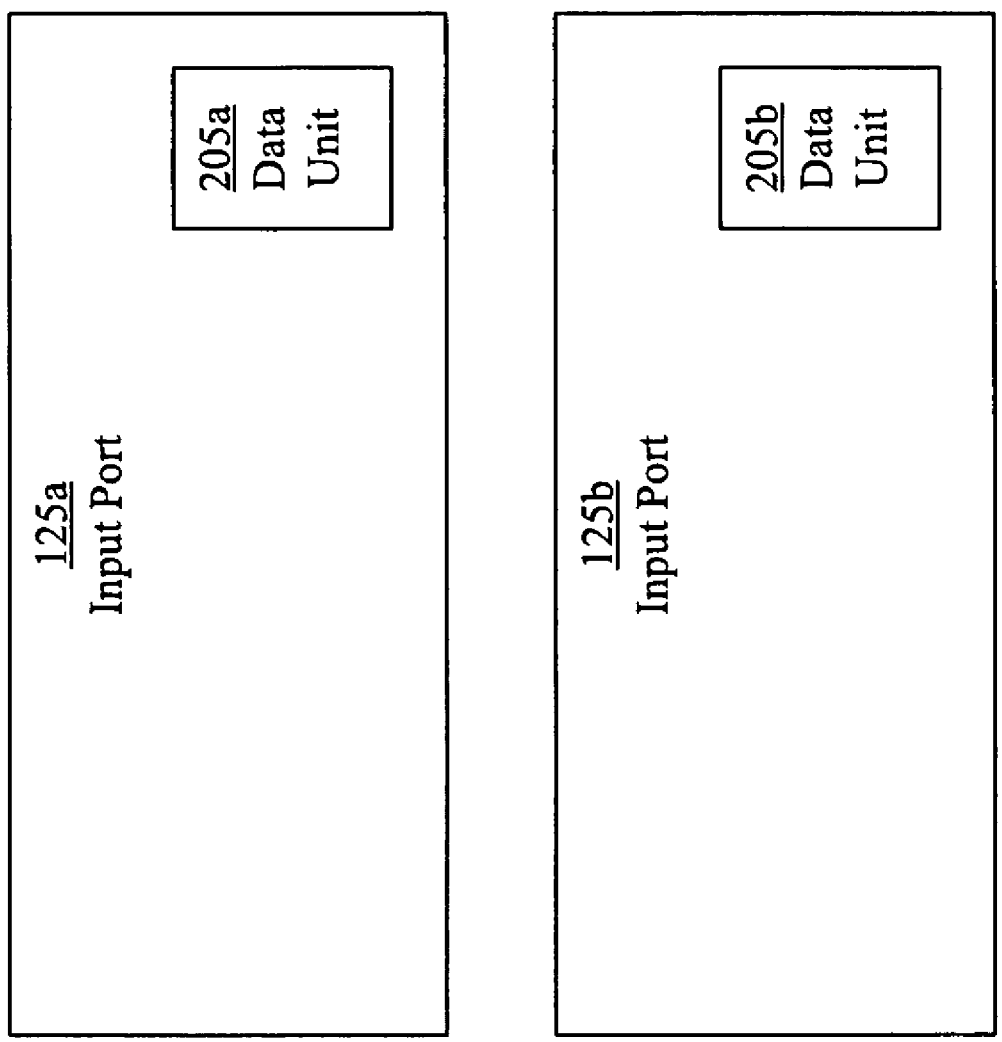

As may be envisioned from FIG. 5A, the input port 125a receives the data unit 205a of a first data packet 200 and stores the data unit 205a in a clock cycle of the clock signal 155. Additionally, the input port 125b receives a data unit 205b of a second data packet 200 and stores the data unit 205b in the same clock cycle of the clock signal 155. For example, the input port 125a may store the data unit 205a in the input buffer 300 of the input port 125a and the input port 125b may store the data unit 205b in the input buffer 300 of the input port 125b. Further, each of the input ports 125 identifies the same destination output port 140 for the data packet 200 received by the input port 125.

The arbiter 130 selects the input port 125a in an arbitration cycle based on the credit values 315 of the input ports 125. In this exemplary embodiment, an arbitration cycle is a clock cycle of the clock signal 155. Moreover, the arbiter 130 gives preference to selecting input ports 125 of the packet switch 105 having higher credit values 315 over input ports 125 having lower credit values 315 based on a round robin algorithm. Because the input port 125a and the input port 125b have the same credit value 315, the arbiter 130 does not give preference to selecting one of the input ports 125a or 125b over the other based on the credit values 315 of the input ports 125a and 125b. Instead, the arbiter 130 selects the input port 125a because the input port 125a is next in an ordered sequence of the input ports 125 according to the round robin algorithm. For example, the arbiter 130 may maintain a circular sequence of indices identifying the input ports 125 and a pointer to the last input port 125 selected by the arbiter 130. In this example, the input ports 125 have an ordered sequence according to the indices of the circular sequence identifying the input ports 125 beginning with the index following the pointer in the circular sequence.

Figure 5B:
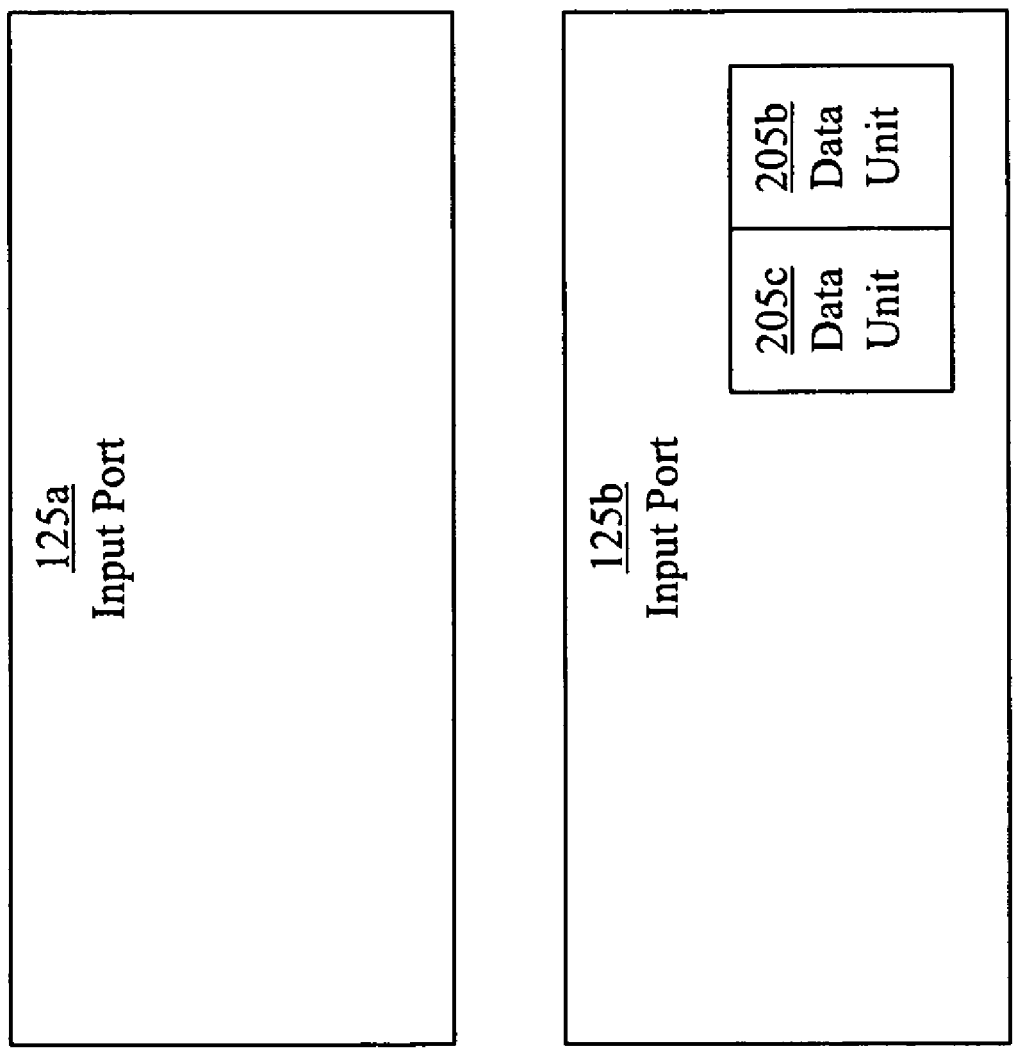

As may be envisioned from FIG. 5A and FIG. 5B, the input port 125a provides the data unit 205a of the first data packet 200 to the switch fabric 135 in the next clock cycle of the clock signal 155. Additionally, the input port 125b receives a data unit 205c of the second data packet 200 in the same clock cycle. The input port 125a does not receive another data unit 205 of the first data packet 200 in the clock cycle because the input bandwidth of the input port 125a is less than the input bandwidth of the input port 125b. The arbiter 130 decrements the credit value 315 of the input port 125a because the switch fabric 135 receives the data unit 205a in the clock cycle. Moreover, the input port 125a remains selected by the arbiter 130 in the clock cycle because the switch fabric 135 has not received each data unit 205 of the first data packet 200 from the input port 125a.

As may be envisioned from FIG. 5B and FIG. 5C, the input port 125a receives a data unit 205d of the first data packet 200 and stores the data unit 205d in the next clock cycle of the clock signal 155. Additionally, the input port 125b receives a data unit 205e of a third data packet 200 and stores the data unit 205e in the same clock cycle. Although the switch fabric 135 does not receive a data unit 205 of the first data packet 200 in the clock cycle, the arbiter 130 decrements the credit value 315 of the input port 125a in the clock cycle because the switch fabric 135 has not received each data unit 205 of the first data packet 200.

As may be envisioned from FIG. 5C and FIG. 5D, the input port 125a provides the data unit 205d of the first data packet 200 to the switch fabric 135 in the next clock cycle of the clock signal 155. Additionally, the input port 125b receives a data unit 205f of the third data packet 200 in the same clock cycle. In this exemplary embodiment, the data unit 205d is the last data unit 205 of the first data packet 200. The input port 125a does not receive a data unit 205 of another data packet 200 in the clock cycle because the input bandwidth of the input port 125a is less than the input bandwidth of the input port 125b.

Further in this clock cycle, the arbiter 130 decrements the credit value 315 of the first input port 125a because the switch fabric 135 received the data unit 205d of the first data packet 200 in the clock cycle. Thus, the arbiter 130 has decremented the credit value 315 of the input port 125a in each of three successive clock cycles of the clock signal 155. In this way, the credit value 315 of the input port 125 has been decremented by the latency of routing the first data packet 200 from the input port 125a to the switch fabric 135. Additionally, the arbiter 130 selects the input port 125b in the clock cycle because the credit value 315 of the input port 125b is greater than the credit value 315 of the input port 125a.

As may be envisioned from FIG. 5D and FIG. 5E, the input port 125b provides the data unit 205b of the second data packet 200 to the switch fabric 135 in the next clock cycle of the clock signal 155. Additionally, the input port 125a receives a data unit 205g of a fourth data packet 200 and the input port 125b receives a data unit 205h of a fifth data packet 200 in the same clock cycle. The arbiter 130 decrements the credit value 315 of the input port 125b because the switch fabric 135 receives the data unit 205b in the clock cycle. The input port 125b remains selected by the arbiter 130 in the clock cycle because the switch fabric 135 has not received each data unit 205 of the second data packet 200 from the input port 125b.

Figure 5F:
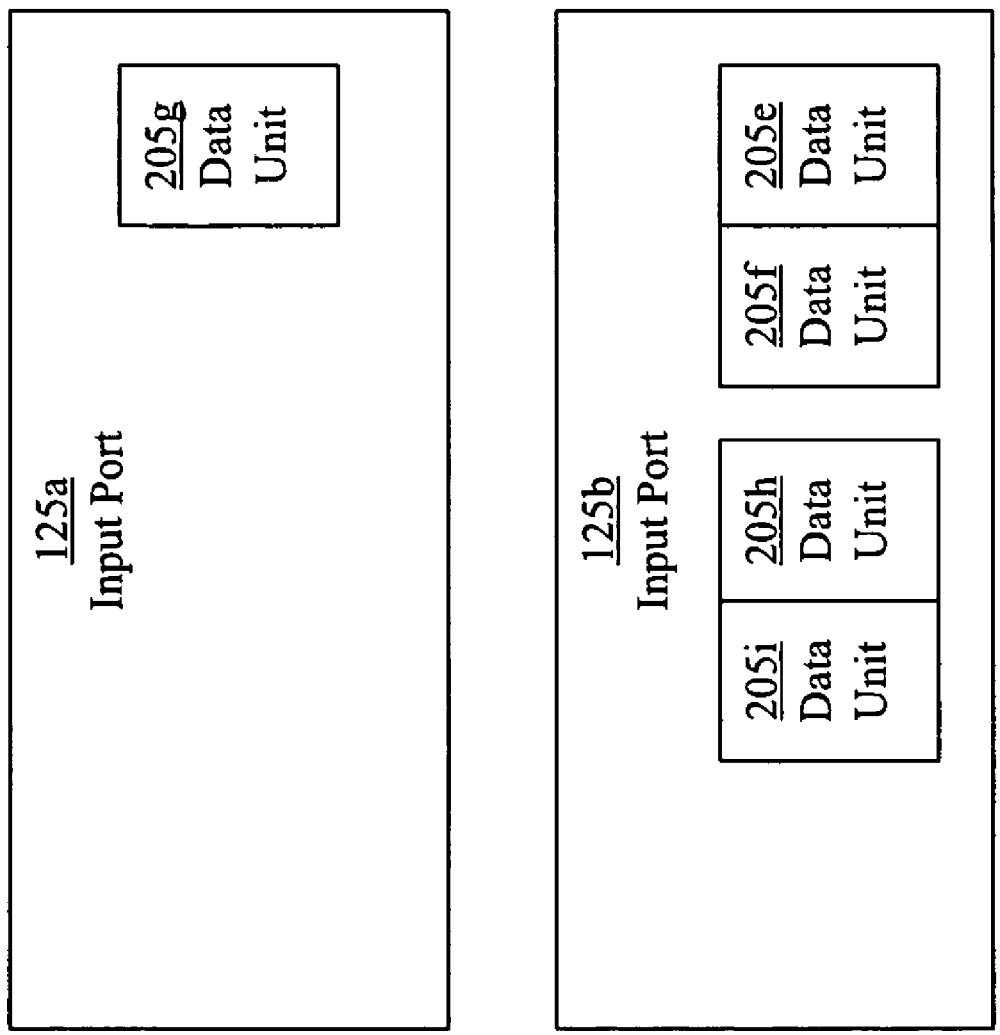

As may be envisioned from FIG. 5E and FIG. 5F, the input port 125b provides the data unit 205c of the second data packet 200 to the switch fabric 135 in the next clock cycle of the clock signal 155. In this exemplary embodiment, the data unit 205c is the last data unit 205 of the second data packet 200. Additionally, the input port 125b receives a data unit 205i of the fifth data packet 200 in the clock cycle. The input port 125a does not receive another data unit 205 of the fourth data packet 200 in the clock cycle because the input bandwidth of the input port 125a is less than the input bandwidth of the input port 125b.

The arbiter 130 decrements the credit value 315 stored in the counter 310 corresponding to the input port 125b because the switch fabric 135 receives the data unit 205c in the clock cycle. Thus, the arbiter 130 has decremented the credit value 315 of the input port 125b in each of two successive clock cycles of the clock signal 155. Further in this clock cycle, the arbiter 130 selects the input port 125b because the credit value 315 of the input port 125b is greater than the credit value 315 of the input port 125a.

As may be envisioned from FIG. 5F and FIG. 5G, the input port 125b provides the data unit 205e of the third data packet 200 to the switch fabric 135 in the next clock cycle of the clock signal 155. Additionally, the input port 125a receives a data unit 205j of the fourth data packet 200 in the same clock cycle. The arbiter 130 decrements the credit value 315 of the input port 125b because the switch fabric 135 receives the data unit 205e in the clock cycle. The input port 125b remains selected by the arbiter 130 in the clock cycle because the switch fabric 135 has not received each data unit 205 of the third data packet 200 from the input port 125b.

As may be envisioned from FIG. 5G and FIG. 5H, the input port 125b provides the data unit 205f of the third data packet 200 to the switch fabric 135 in the next clock cycle of the clock signal 155. In this exemplary embodiment, the data unit 205f is the last data unit 205 of the third data packet 200. The arbiter 130 decrements the credit value 315 of the input port 125b because the switch fabric 135 receives the data unit 205f in the clock cycle. Thus, in this exemplary embodiment, the credit value 315 of the input port 125a has been decremented by three and the credit value 315 of the input port 125b has been decremented by four. Further in the clock cycle, the arbiter 130 selects the input port 125a because the credit value 315 of the input port 125a is greater than the credit value 315 of the input port 125b.

In this exemplary embodiment, the arbiter 130 selected the input port 125b twice without selecting the input port 125a because the credit value 315 of the input port 125b remained greater than the credit value 315 of the input port 125a. As a result, the switch fabric 135 received two data packets 200 from the input port 125b but only received one data packet 200 from the input port 125a, which has a lower input bandwidth than the input port 125b. In this way, routing congestion is reduced in the packet switch 105 by selecting an input port 125 having a higher credit value 315 over an input port 125 having a lower credit value 315.

As illustrated in FIG. 5H, the input port 125a has accumulated and stored two data units 205 (e.g., the data unit 205g and the data unit 205j) of the fourth data packet 200. Because the arbiter 130 selected the input port 125a in the clock cycle, the switch fabric 135 receives the data unit 205g in the next clock cycle of the clock signal 155 and the data unit 205j in the following clock cycle of the clock signal 155. In this way, latency of the fourth data packet 200 decreases and data packet throughput increases in the packet switch 105 by giving preference to selecting an input port 125 having a higher credit value 315 over an input port 125 having a lower credit value 315.

In some embodiments, the arbiter 130 selects one or more input ports 125 in an arbitration cycle and each selected input port 125 provides a data unit 205 of a data packet 200 to the switch fabric 135 in the arbitration cycle. In other embodiments, the arbiter 130 selects one or more input ports 125 in an arbitration cycle and each selected input port 125 provides a data unit 205 of a data packet 200 to the switch fabric in a subsequent clock cycle. For example, the arbiter 130 may select input ports 125 in an arbitration cycle and each input port 125 selected in the arbitration cycle may output a data unit 205 of a data packet 200 to the switch fabric 135 in the next arbitration cycle. In some embodiments, an arbitration cycle occurs in a clock cycle of the clock signal 155. In other embodiments, an arbitration cycle spans multiple clock cycles of the clock signal 155.

Figure 6:
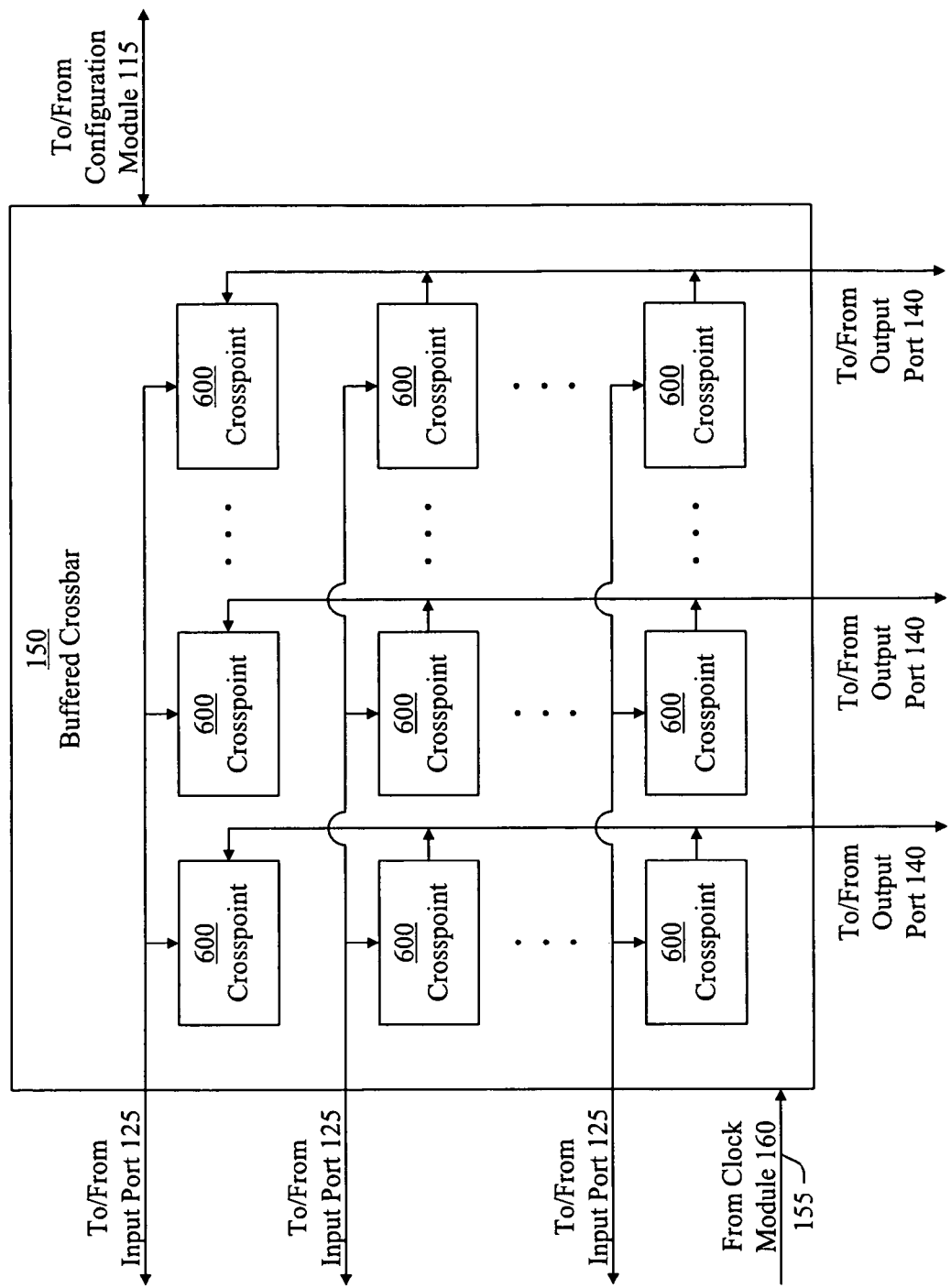
FIG. 6 is a block diagram of a buffered crossbar, in accordance with an embodiment of the present invention.

FIG. 6 illustrates the buffered crossbar 150, in accordance with an embodiment of the present invention. The buffered crossbar 150 includes crosspoints 600 interconnected with each other. Each of the crosspoints 600 is coupled (e.g., connected) to an input port 125 and an output port 140 of the packet switch 105. As may be envisioned from FIG. 6, the crosspoints 600 form a square matrix including rows of crosspoints 600 and columns of crosspoints 600. Each crosspoint 600 in a row of the matrix corresponds to an input port 125 of the packet switch 105 and is coupled (e.g., connected) to the input port 125. Moreover, each crosspoint 600 in a column of the matrix corresponds to an output port 140 of the packet switch 105 and is coupled (e.g., connected) to the output port 140. In this way, each of the input ports 125 is coupled to an output port 140 through a crosspoint 600 in the buffered crossbar 150.

Each crosspoint 600 receives data units 205 of a data packet 200 from the input port 125 corresponding to the crosspoint 600, stores the data units 205 of the data packet 200, and sends (e.g., routes) the data units 205 of the data packet 200 to the output port 140 corresponding to the crosspoint 600. In one embodiment, the crosspoint 600 has a storage capacity for storing one data unit 205 of a data packet 200. In this way, the crosspoint 600 is capable of storing a single data unit 205 of a data packet 200 at a given time. In other embodiments, the crosspoint 600 has a storage capacity for storing more than one data unit 205 of a data packet 200 and is capable of storing more than one data unit 205 of the data packet 200 at a given time. In some embodiments, the crosspoint 600 is capable of storing data units 205 of multiple data packets 200 at the same time.

In various embodiments, the arbiter 130 is distributed among the input ports 125, the crosspoints 600, and the output ports 140. In these embodiments, each input port 125 and the crosspoints 600 coupled to the input port 125 (e.g., crosspoints 600 in the row of the matrix corresponding to the input port 125) perform arbitration by selecting one of the crosspoints 600 coupled to the input port 125 based on the capacity of the crosspoint 600 to accept a data unit 205. For example, a crosspoint 600 may have capacity to accept a data unit 205 of a data packet 200 from an input port 125 when the crosspoint 600 has storage capacity to store the data unit 205. In some embodiments, each input port 125 and the crosspoints 600 coupled to the input port 125 perform arbitration on the crosspoints 600 coupled to the input port 125 by using a round robin algorithm.

Additionally, each output port 140 and the crosspoints 600 coupled to the output port 140 (e.g., crosspoints 600 in the column of the matrix corresponding to the output port 140) perform arbitration by selecting one of the crosspoints 600 coupled to the output port 140 and containing a data unit 205 of a data packet 200 to be routed to the output port 140. In some embodiments, each output port 140 and the crosspoints 600 coupled to the output port 140 perform arbitration on the crosspoints 600 coupled to the output port 140 by using a credit based arbitration algorithm, such as a proportional fairness algorithm.

Figure 7:
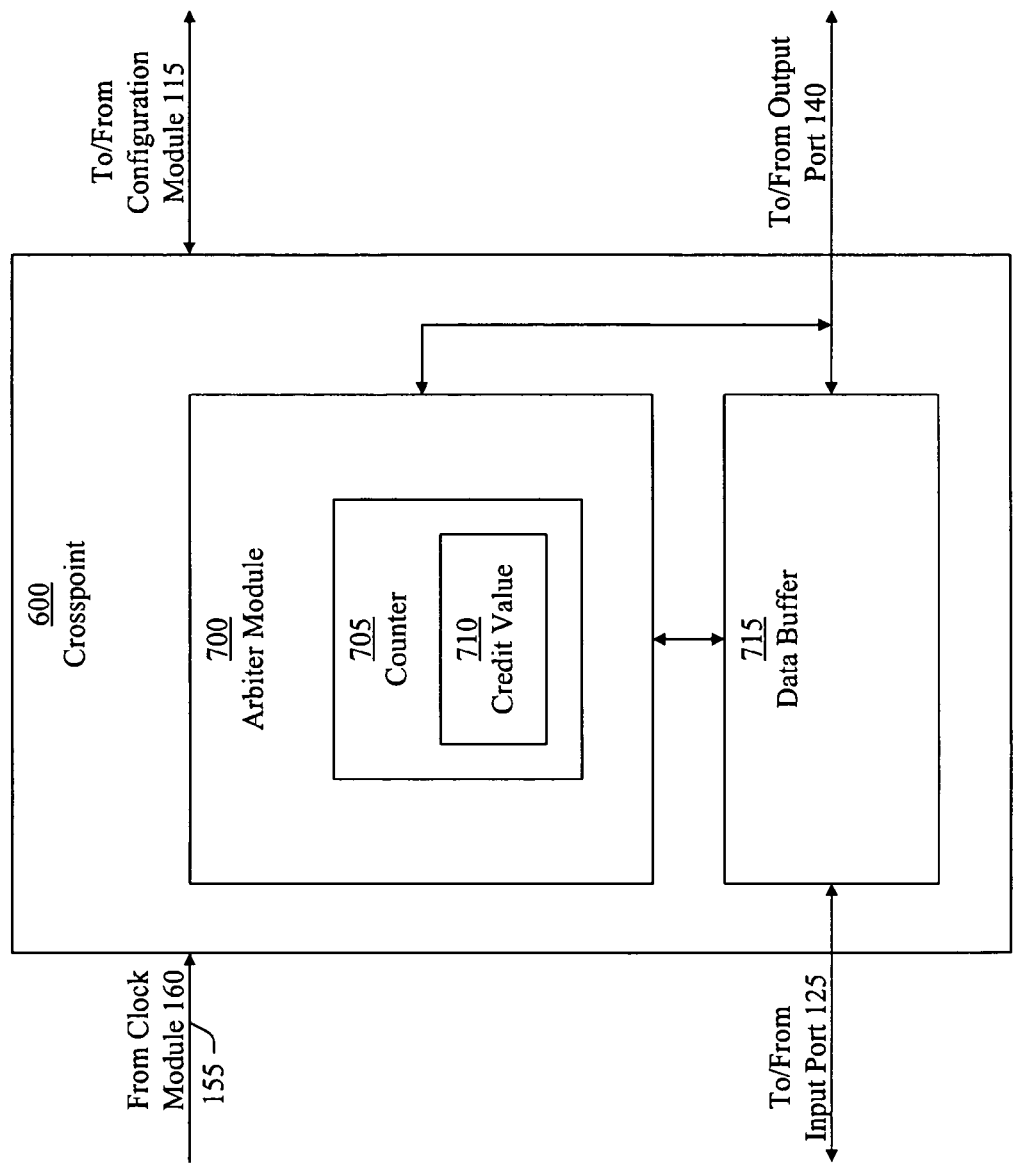
FIG. 7 is a block diagram of a crosspoint, in accordance with an embodiment of the present invention.

FIG. 7 is a block diagram of the crosspoint 600, in accordance with an embodiment of the present invention. The crosspoint 600 includes an arbiter module 700 and a data buffer 715 coupled (e.g., connected) to the arbiter module 700. The data buffer 715 receives data units 205 of data packets 200 from the input port 125 corresponding to the crosspoint 600 and stores the data units 205 of the data packets 200 based on the clock signal 155. In this way, the data buffer 715 is a storage location in the crosspoint 600. The arbiter modules 700 in the buffered crossbar 150 are part of the arbiter 130 and perform arbitration in the packet switch 105 in conjunction with the input ports 125 and the output ports 140 of the packet switch 105. In this way, the arbiter 130 is distributed in the packet switch 105.

In various embodiments, the arbiter modules 700 of the crosspoints 600 in the buffered crossbar 150 corresponding to an input port 125 (e.g., the crosspoints 600 in the row of the matrix corresponding to the input port 125) and the packet engine 305 of the input port 125 arbitrate for access to the crosspoints 600 corresponding to the input port 125. The arbiter module 700 of at least one crosspoint 600 corresponding to the input port 125 that is ready to receive a data unit 205 from the input port 125 grants access to the input port 125. The input port 125 selects a crosspoint 600 that granted access to the input port 125 and sends a data unit 205 to the crosspoint 600. In turn, the crosspoint 600 stores the data unit 205 in the data buffer 715 of the crosspoint 600. In this way, the data buffer 715 is a storage location for the data unit 205 in the crosspoint 600.

The packet engine 400 of an output port 140 arbitrates for access to the crosspoints 600 in the buffered crossbar 150 corresponding to the output port 140 (e.g., crosspoints 600 in the column of the matrix corresponding to the output port 140). The arbiter module 700 of at least one crosspoint 600 corresponding to the output port 140 and containing a data unit 205 ready to be sent to the output port 140 grants access to the output port 140. In turn, the output port 140 selects a crosspoint 600 that granted access to the output port 140, reads one or more data units 205 from the crosspoint 600, and outputs each data unit 205 from the packet switch 105.

In various embodiments, the data buffer 715 stores one or more data units 205 of a single data packet 200. In other embodiments, the data buffer 715 stores data units 205 of more than one data packet 200. In some embodiments, the configuration module 115 is coupled (e.g., connected) to the arbiter modules 700. In these embodiments, the configuration module 115 configures operation of the arbiter modules 700. Moreover, a user may program the arbiter modules 700 by providing user input to the configuration module 115. In this way, the arbiter modules 700 are programmable by the user.

In some embodiments, the arbiter module 700 of a crosspoint 600 communicates with the output port 140 corresponding to the crosspoint 600 to send a data unit 205 to the output port 140. For example, the output port 140 may provide a signal to the arbiter module 700 indicating that the output port 140 is ready to receive a data unit 205. In turn, the arbiter module 700 may obtain access to the output port 140 and send a data unit 205 from the data buffer 715 to the output port 140. As another example, the arbiter module 700 may provide a signal to the output port 140 indicating that the data buffer 715 contains a data unit 205. In this example, the packet engine 400 of the output port 140 selects the crosspoint 600 containing the arbiter module 700 and reads the data unit 205 from the data buffer 715 of the crosspoint 600. In this way, the crosspoint 600 sends the data unit 205 to the output port 140.

In various embodiments, the arbiter module 700 includes a counter 705 for storing a credit value 710 of the crosspoint 600 containing the arbiter module 700. Moreover, the arbiter module 700 maintains the credit value 710 of the crosspoint 600 based on the latency for routing a data packet 200 from the crosspoint 600 to the output port 140 coupled to the crosspoint 600. In one embodiment, the arbiter module 700 provides a first control signal to the counter 705 of the crosspoint 600 when the crosspoint 600 routes the first data unit 205 of a data packet 200 from the crosspoint 600 to the corresponding output port 140. Further, the arbiter module 700 provides a second control signal to the counter 705 when the crosspoint 600 routes the last data unit 205 of the data packet 200 from the crosspoint 600 to the corresponding output port 140. In response to the first control signal, the counter 705 decrements the credit value 710 stored in the counter 705 in each subsequent clock cycle of the clock signal 155 until the counter 705 receives the second control signal from the arbiter module 700. In this way, the arbiter module 700 decrements the counter 705 by the latency for routing the data packet 200 from the crosspoint 600 to the corresponding output port 140.

In another embodiment, the arbiter module 700 provides the first control signal to the counter 705 of the crosspoint 600 when the arbiter module 700 selects the crosspoint 600 instead of when the crosspoint 600 routes the first data unit 205 of the data packet 200 from crosspoint 600 to the corresponding output port 140. In some embodiments, the counter 705 of a crosspoint 600 is external of the arbiter module 700 in the crosspoint 600. In some embodiments, the counter 705 of a crosspoint 600 is external of the crosspoint 600. For example, the arbiter 130 may contain the counters 705 corresponding to the crosspoints 600. In some embodiments, the output port 140 corresponding to the crosspoint 600 contains the counter 705 of the crosspoint 600. For example, the packet engine 400 of the output port 140 corresponding to the crosspoint 600 may contain the counter 705 corresponding to the crosspoint 600. In some embodiments including the buffered crossbar 150, the counters 310 in the input ports 125 are optional. Moreover, the packet switch 105 need not maintain credit values 315 for the input ports 125 or determine latencies for routing data packets 200 from the input ports 125 to the switch fabric 135 in these embodiments.

Figure 8:
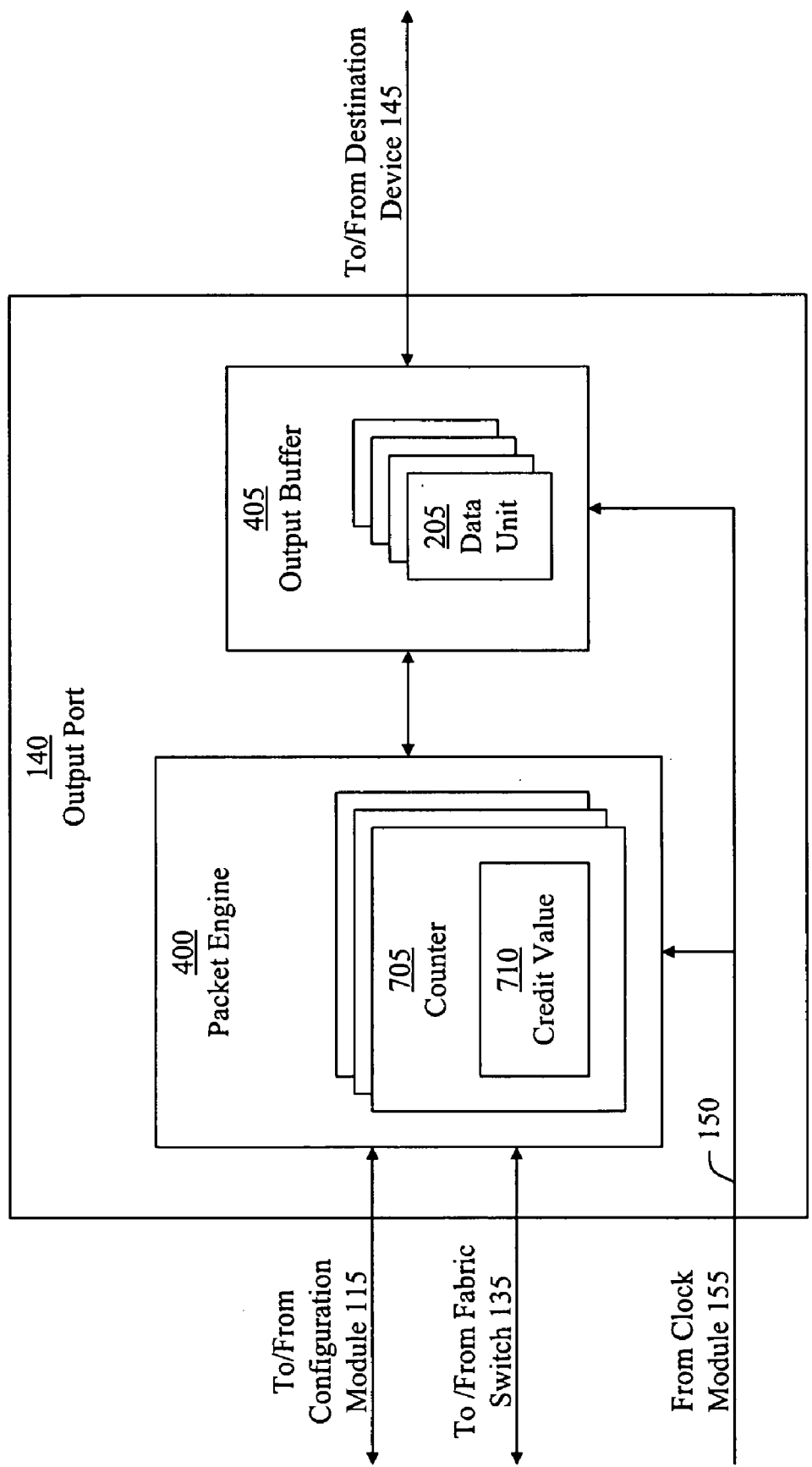
FIG. 8 is a block diagram of an output port of a packet switch, in accordance with an embodiment of the present invention.

FIG. 8 illustrates the output port 140, in accordance with an embodiment of the present invention. The output port 140 of FIG. 8 is similar to the output port 140 of FIG. 4 and includes a packet engine 400 and an output buffer 405 coupled (e.g., connected) to the packet engine 400. In contrast to the output port 140 of FIG. 4, the output port 140 of FIG. 8 includes the counters 705 of the crosspoints 600 corresponding to the output port 140 (e.g., the crosspoints 600 in the column of the matrix corresponding to the output port 140). In this way, interconnects (e.g., wires or traces) between the packet engine 400 of the output port 140 and the counters 705 of the crosspoints 600 corresponding to the output port 140 are reduced. As illustrated in FIG. 8, the counters 705 of the crosspoints 600 corresponding to the output port 140 are contained in the packet engine 400 of the output port 140. In other embodiments, the counters 705 contained in the output port 140 may be external of the packet engine 400 of the output port 140.

Figure 9:
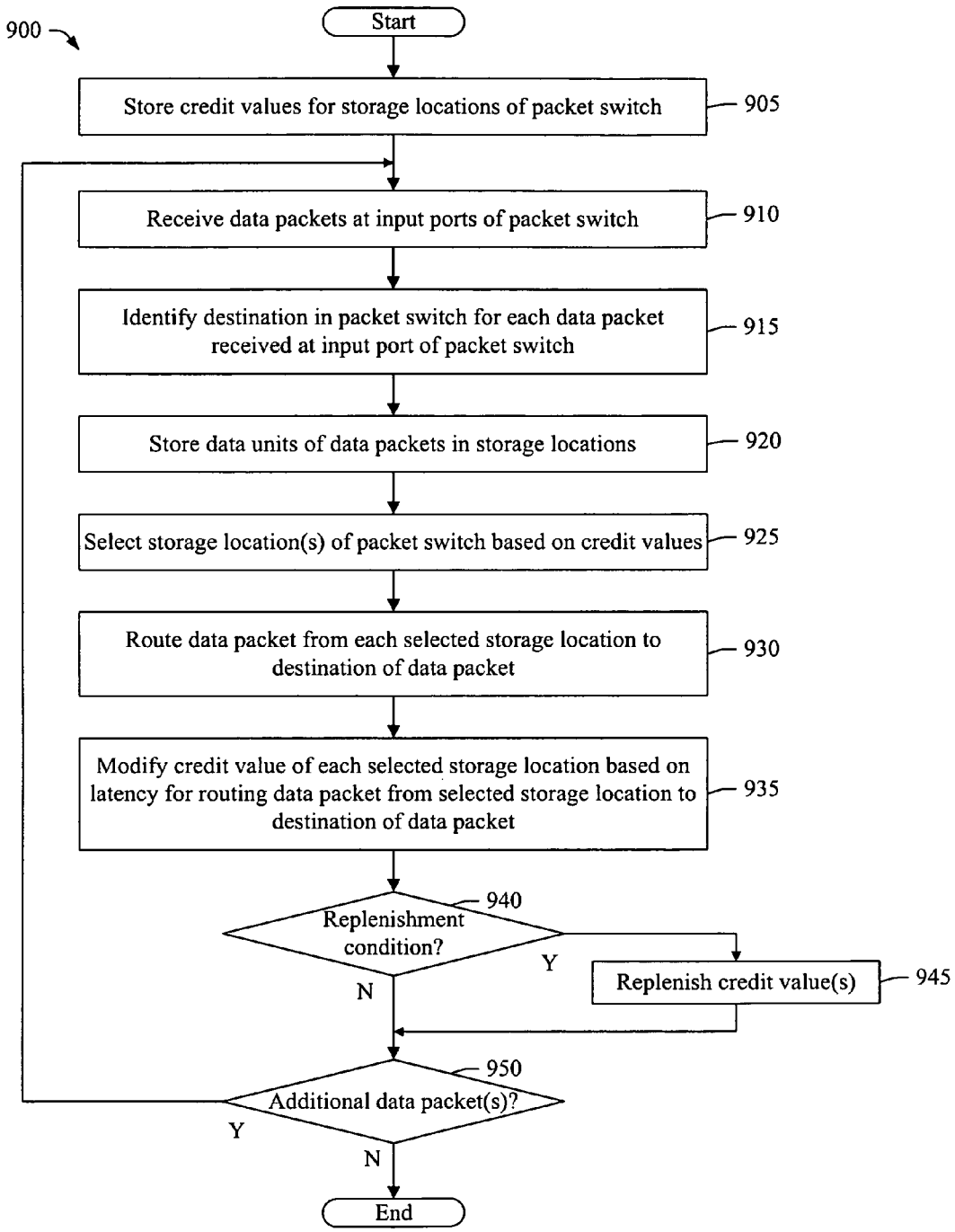
FIG. 9 is a flow chart of a method of routing data packets through a packet switch including input ports having various input bandwidths, in accordance with an embodiment of the present invention.

FIG. 9 illustrates a method 900 of routing data packets through a packet switch including input ports having various input bandwidths, in accordance with an embodiment of the present invention. In step 905, credit values are stored for storage locations of a packet switch. In various embodiments, a credit value 315 is stored for each input port 125 of the packet switch 105 by storing the credit value 315 in the counter 310 corresponding to the input port 125. In these embodiments, the input ports 125 are the storage locations along routing paths from the input ports 125 to the output ports 140 of the packet switch 105. In some embodiments, each input port 125 contains the counter 310 corresponding to the input port 125. In other embodiments, the arbiter 130 contains the counters 310 corresponding to the input ports 125. In some embodiments, the packet engine 305 of an input port 125 writes a credit value 315 into the corresponding counter 310 of the input port 125 by initializing the counter 310 to an initial credit value 315, for example upon reset or power up of the packet switch 105. In turn, the counter 310 stores the initial credit value 315. In other embodiments, the arbiter 130 writes a credit value 315 into each counter 310 by initializing each counter 310 to an initial credit value 315, for example upon reset or power up of the packet switch 105.

In embodiments including the buffered crossbar 150, a credit value 710 is stored for each crosspoint 600 of the buffered crossbar 150 by storing the credit value 710 in the counter 705 corresponding to the crosspoint 600. In these embodiments, the crosspoints 600 of the buffered crossbar 150 are the storage locations along routing paths from the input ports 125 to the output ports 140 of the packet switch 105. In some embodiments, each crosspoint 600 contains the counter 705 corresponding to the crosspoint 600. In other embodiments, the arbiter 130 or the output ports 140 contain the counters 705 corresponding to the crosspoints 600. In some embodiments, the arbiter 130 writes a credit value 710 into the counter 705 of each crosspoint 600 by initializing the counter 705 to an initial credit value 710, for example upon reset or power up of the packet switch 105. In turn, the counter 705 stores the initial credit value 710. In other embodiments, the arbiter 130 writes a credit value 710 into each counter 705 by initializing each counter 705 to an initial credit value 710, for example upon reset or power up of the packet switch 105. The method 900 then proceeds to step 910.

In step 910, data packets are received at input ports of the packet switch. In various embodiments, one or more input ports 125 of the packet switch 105 receives a data packet 200 from the source device 120 corresponding to the input port 125 by receiving at least one data unit 205 of the data packet 200 at the input bandwidth of the input port 125. Further, the input port 125 stores each data unit 205 of the data packet 200 received from the source device 120. In various embodiments, the input buffer 300 of the input port 125 has a storage capacity to store one or more data units 205 of the data packet 200. The method 900 then proceeds to step 915.

In step 915, a destination in the packet switch is identified for each data packet received at an input port of the packet switch. In various embodiments, the packet engine 305 of each input port 125 receiving a data packet 200 identifies an output port 140 (e.g., a destination output port 140) for the data packet 200 based on one or more data units 205 of the data packet 200 stored in the input buffer 300 of the input port 125. In this way, the packet engine 305 also identifies the switch fabric 135 as a destination (e.g., an intermediate destination) of the data packet 200.

In embodiments including the buffered crossbar 150, the packet engine 305 of each input port 125 receiving a data packet 200 identifies a destination output port 140 for the data packet 200 as the destination of the data packet 200 based on one or more data units 205 of the data packet 200 stored in the input buffer 300 of the input port 125. For example, the packet engine 305 of the input port 125 may identify the destination output port 140 of the data packet 200 based on a destination address in a data unit 205 of the data packet 200. The method 900 then proceeds to step 920.

In step 920, data units of the data packets are stored in the storage locations of the packet switch. In various embodiments, each input port 125 receiving a data unit 205 of a data packet 200 stores the data unit 205 in the input buffer 300 of the input port 125. In these embodiments, the input ports 125 are the storage locations along the routing paths of the packet switch 105.

In embodiments including the buffered crossbar 150, each input port 125 receiving a data unit 205 of a data packet 200 sends (e.g., routes) the data unit 205 to a crosspoint 600 of the buffered crossbar 150 and the crosspoint 600 stores the data unit 205. In these embodiments, the crosspoints 600 of the buffered crossbar 150 are the storage locations along the routing paths of the packet switch 105. The method 900 then proceeds to step 925.

In step 925, storage locations of the packet switch are selected based on the credit values. In various embodiments, the arbiter 130 selects one or more input ports 125 (e.g., storage locations) containing at least one data unit 205 of a data packet 200 based on the credit values 315 of the input ports 125 in the packet switch 105. For example, the arbiter 130 may select input ports 125 based on the credit values 315 in an arbitration cycle so that the switch fabric 135 is capable of routing a data unit 205 from each selected input port 125 to the destination output port 140 of the data packet 200 in the arbitration cycle. In various embodiments, the arbiter 130 selects one or more input ports 125 in the arbitration cycle to minimize variance among the credit values 315, as is described more fully herein. For example, the arbiter 130 may select one or more input ports 125 in the arbitration cycle by giving preference to input ports 125 containing at least one data unit 205 and having higher credit values 315 than other input ports 125.

In embodiments including the buffered crossbar 150, the arbiter 130 selects one or more crosspoints 600 (e.g., storage locations) containing at least one data unit 205 of a data packet 200 based on the credit values 710 of the crosspoints 600 in the buffered crossbar 150. For example, the arbiter 130 may select a crosspoint 600 in each column of the matrix of crosspoints 600 in the buffered crossbar 150 based on the credit values 710 of the crosspoints 600 in the column in an arbitration cycle so that the switch fabric 135 is capable of routing a data unit 205 from each selected crosspoint 600 to the destination output port 140 of the data packet 200 in the arbitration cycle. In various embodiments, the arbiter 130 selects a crosspoint 600 in a column of the matrix in the arbitration cycle to minimize variance among the credit values 710 of the crosspoints 600 in the column. For example, the arbiter 130 may select a crosspoint 600 in a column of the matrix in the arbitration cycle by giving preference to crosspoints 600 in the column containing at least one data unit 205 and having nonnegative credit values 710 over other crosspoints 600 in the column containing at least one data unit 205 and having negative credit values 710. The method 900 then proceeds to step 930.

In step 930, a data packet is routed from each selected storage location to the destination of the data packet. In embodiments in which the storage locations are the input ports 125, each selected input port 125 (e.g., each selected storage location) routes a data packet 200 to the switch fabric 135 (e.g., the destination of the data packet 200). Further, the switch fabric 135 routes each data packet 200 received from a selected input port 125 to the destination output port 140 of the data packet 200. In embodiments in which the storage locations are the crosspoints 600 of the buffered crossbar 150, each selected crosspoint 600 (e.g., each selected storage location) routes a data packet 200 to the destination output port 140 of the data packet 200 (e.g., the destination of the data packet 200).

In various embodiments, the time period for routing each data unit 205 of a data packet 200 from a selected storage location (e.g., an input port 125 or a crosspoint 600) to the destination of the data packet 200 (e.g., the switch fabric 135 or an output port 140) defines a latency of the data packet 200. Moreover, the time period for routing each data unit 205 of the data packet 200 from the selected storage location to the destination of the data packet 200 may span more than one arbitration cycle. The method 900 then proceeds to step 935.

In step 935, the credit value of each selected storage location is modified based on the latency for routing the data packet from the selected storage location to the destination of the data packet. In embodiments in which the storage locations are the input ports 125 of the packet switch 105, the arbiter 130 modifies the credit value 315 stored in the counter 310 corresponding to each selected input port 125 based on the latency for routing the data packet 200 from the selected input port 125 to the switch fabric 135. For example, the arbiter 130 may decrease the credit value 315 of a selected input port 125 based on the latency for routing the data packet 200 from the selected input port 125 to the switch fabric 135. In some embodiments, the arbiter 130 decrements the credit value 315 stored in the counter 310 of each selected input port 125 by the number of clock cycles of the clock signal 155 for routing the data units 205 of the data packet 200 from the selected input port 125 to the switch fabric 135.

In embodiments in which the storage locations are the crosspoints 600 of the buffered crossbar 150, the arbiter 130 modifies the credit value 710 stored in the counter 705 corresponding to each selected crosspoint 600 based on the latency for routing the data packet 200 from the selected crosspoint 600 to the destination output port 140 of the data packet 200 (e.g., the destination of the data packet 200). For example, the arbiter 130 may decrease the credit value 710 of a selected crosspoint 600 based on the latency for routing the data packet 200 from the selected crosspoint 600 to the destination output port 140 of the data packet 200. In some embodiments, the arbiter 130 decrements the credit value 710 stored in the counter 705 of each selected crosspoint 600 by the number of clock cycles of the clock signal 155 for routing the data units 205 of the data packet 200 from the selected crosspoint 600 to the destination output port 140 of the data packet 200. The method 900 then proceeds to step 940.

In step 940, it is determined whether a replenishment condition has occurred. In various embodiments, a replenishment condition occurs when one of the credit values (e.g., the credit values 315 or the credit values 710) reaches a replenishment threshold value. For example, a replenishment condition may occur when one of the credit values 315 reaches a replenishment threshold value of zero. As another example, a replenishment condition may occur when one of the credit values 710 reaches a replenishment threshold value of zero. In some embodiments, the arbiter 130 determines whether a replenishment condition has occurred. In other embodiments, one or more of the packet engines 305 or 400 determines whether a replenishment condition has occurred. In some embodiments including the buffered crossbar 150, one or more of the crosspoints 600 determines whether a replenishment condition has occurred. If a replenishment condition occurs, the method 900 proceeds to step 945, otherwise the method 900 proceeds to step 950.

In step 945, arrived at from step 940 in which it has been determined that a replenishment condition has occurred, the credit values are replenished. In various embodiments, the arbiter 130 replenishes the credit values (e.g., the credit values 315 or the credit values 710) by adding a replenishment value to one or more of the credit values. For example, the arbiter 130 may add a replenishment value to a credit value 315 stored in a counter 310. As another example, the arbiter 130 may add a replenishment value to a credit value 710 stored in a counter 705. In some embodiments, the arbiter 130 replenishes the credit values 315 by reinitializing the credit values 315 stored in the counters 310. In some embodiments including the buffered crossbar 150, the arbiter 130 replenishes the credit values 710 by reinitializing the credit values 710 stored in the counters 705. The method 900 then proceeds to step 950.

In step 950, arrived at from step 940 in which it has been determined that a replenishment condition has not occurred, or from step 945 in which the credit values are replenished, a determination is made as to whether additional data packet(s) are to be routed through the packet switch. In various embodiments, the packet switch 105 determines whether an additional data packet 200 is to be routed through the packet switch 105. For example, the packet switch 105 may determine that an additional data packet 200 is to be routed through the packet switch 105 if at least one input port 125 contains a data unit 205 of data packet 200 received by the input port 125. If an additional data packet 200 is to be routed through the packet switch 105, the method 900 returns to step 910, otherwise the method 900 ends.

In various embodiments, the method 900 may include more or fewer steps than the steps 905-950 described above and illustrated in FIG. 9. In some embodiments, one or more of the steps 905-950 of the method 900 may be performed in parallel or substantially simultaneously. For example the step 930 and the step 935 may be performed in parallel. In various embodiments, the steps 905-950 of the method 900 may be performed in a different order than the order described above and illustrated in FIG. 9. For example, step 910 may be performed before step 905.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A packet switch, comprising:
   a plurality of output ports;
   a plurality of input ports, each input port of the plurality of input ports configured to receive a data packet including data units at the input bandwidth of the input port and identify a destination output port of the plurality of output ports for the data packet;

a switch fabric coupled to the plurality of input ports and the plurality of output ports;

a plurality of credit counters corresponding to the plurality of input ports and configured to store a corresponding plurality of credit values for the plurality of input ports;

a plurality of latency counters corresponding to the plurality of input ports; and an arbiter coupled to the plurality of input ports, the plurality of credit counters, and the plurality of latency counters, the arbiter configured to select an input port of the plurality of input ports in a plurality of nonconsecutive arbitration cycles based on the plurality of credit values, the selected input port configured to route the data packet received at the selected input port to the switch fabric in the plurality of nonconsecutive arbitration cycles by routing a data unit of the data packet in each arbitration cycle of the plurality of nonconsecutive arbitration cycles, the arbiter further configured to measure a latency for routing the data packet received at the selected input port from the selected input port to the switch fabric by starting the latency counter corresponding to the selected input port for a first data unit of the data packet routed from the selected input port to the switch fabric and stopping the latency counter corresponding to the selected input port for a last data unit of the data packet routed from the selected input port to the switch fabric such that the latency counter corresponding to the selected input port indicates the measured latency, the arbiter further configured to modify the credit value of the selected input port based on the measured latency for reducing variance among latencies of data packets subsequently routed through the packet switch, wherein the latency for routing the data packet received at the selected input port to the switch fabric is equal to a number of clock cycles of a clock signal spanning a time period for routing the data packet from the selected input port to the switch fabric, the switch fabric configured to route the data packet received from the selected input port to the destination output port of the data packet.

2. The packet switch of claim 1, wherein the arbiter is further configured to modify the credit value of each selected input port by decrementing the credit value of the selected input port by the number of clock cycles spanning the time period for routing the data packet from the selected input port to the switch fabric.

3. The packet switch of claim 1, wherein at least two input ports of the plurality of input ports have different internal bandwidths, each of the at least two input ports configured to output the data packet received at the input port to the switch fabric at the internal bandwidth of the input port.

4. The packet switch of claim 1, wherein each input port of the plurality of input ports comprises:

an input buffer having a storage capacity to store at least one data unit of a data packet received by the input port; and a packet engine coupled to the input buffer and configured to identify the destination output port for the data packet received by the input port based on a data unit of the data packet received by the input port and to route the data packet to the switch fabric.

5. The packet switch of claim 1, wherein the switch fabric is further configured to route the data units of the data packet received from the selected input port by routing the data units of the data packet to the destination output port of the data packet as an atomic unit.

6. The packet switch of claim 1, wherein the switch fabric comprises a buffered crossbar comprising a plurality of crosspoints, each crosspoint of the plurality of crosspoints comprising a data buffer for storing at least one data unit of a data packet.

7. The packet switch of claim 1, further comprising a configuration module coupled to the plurality of input ports and configured to select an input bandwidth for each input port of the plurality of input ports and to configure each input port of the plurality of input ports to receive data packets at the input bandwidth selected for the input port.

8. A packet switch, comprising:

a plurality of output ports;

a plurality of input ports, each input port of the plurality of input ports configured to receive a data packet including data units and identify a destination output port of the plurality of output ports for the data packet;

a switch fabric coupled to the plurality of input ports and the plurality of output ports, the switch fabric comprising a buffered crossbar including a plurality of crosspoints each configured to store at least one data unit of a data packet;

a plurality of credit counters corresponding to the plurality of crosspoints and configured to store a corresponding plurality of credit values for the plurality of crosspoints;

a plurality of latency counters corresponding to the plurality of crosspoints; and an arbiter coupled to the plurality of output ports, the plurality of credit counters, and the plurality of latency counters, the arbiter configured to select a crosspoint of the plurality of crosspoints in a plurality of nonconsecutive arbitration cycles based on the plurality of credit values, the selected crosspoint further configured to route a data packet received at the selected crosspoint to the destination output port of the data packet in the plurality of nonconsecutive arbitration cycles by routing a data unit of the data packet in each arbitration cycle of the plurality of nonconsecutive arbitration cycles, the arbiter further configured to measure a latency for routing the data packet received at the selected crosspoint from the selected crosspoint to the destination output port of the data packet by starting the latency counter corresponding to the selected crosspoint for a first data unit of the data packet routed from the selected crosspoint to the destination output port and stopping the latency counter corresponding to the selected crosspoint for a last data unit of the data packet routed from the selected crosspoint to the destination output port such that the latency counter corresponding to the selected crosspoint indicates the measured latency, the arbiter further configured to modify the credit value of the selected crosspoint for reducing variance among latencies of data packets subsequently routed through the packet switch, wherein the latency for routing the data packet from the selected crosspoint to the destination output port of the data packet is equal to a number of clock cycles of a clock signal spanning a time period for routing the data packet from the selected crosspoint to the destination output port of the data packet.

9. The packet switch of claim 8, wherein the arbiter is further configured to modify the credit value of the selected crosspoint by decrementing the credit value of the selected crosspoint by the number of clock cycles spanning a time period for routing the data packet from the selected crosspoint to the destination output port of the data packet.

10. The packet switch of claim 8, wherein each input port of the plurality of input ports comprises:

an input buffer having a storage capacity to store at least one data unit of a data packet received by the input port; and a packet engine coupled to the input buffer and configured to identify the destination output port for the data packet received by the input port based on a data unit of the data packet received by the input port and to route the data packet to the switch fabric.

11. The packet switch of claim 8, wherein the selected crosspoint is further configured to route a data packet from the selected crosspoint to the destination output port of the data packet by routing the data packet to the destination output port of the data packet as an atomic unit.

12. The packet switch of claim 8, further comprising a configuration module coupled to the plurality of input ports and configured to select an input bandwidth for each input port of the plurality of input ports and to configure each input port of the plurality of input ports to receive data packets at the input bandwidth selected for the input port.

13. A method of routing data packets through a packet switch, the method comprising:

receiving data packets including data units at a plurality of input ports of a packet switch;

identifying a destination output port of a plurality of output ports in the packet switch for each of the data packets;

storing a data unit of each of the data packets in a corresponding crosspoint of a plurality of crosspoints in a switch fabric of the packet switch;

selecting a crosspoint of the plurality of crosspoints in a plurality of nonconsecutive arbitration cycles based on the plurality of credit values;

routing a data packet from the selected crosspoint to the destination output port of the data packet in the plurality of nonconsecutive arbitration cycles by routing a data unit of the data packet in each arbitration cycle of the plurality of nonconsecutive arbitration cycles;

measuring a latency for routing the data packet from the selected crosspoint to the destination output port of the data packet by starting a latency counter corresponding to the selected crosspoint for a first data unit of the data packet routed from the selected crosspoint and stopping the latency counter corresponding to the selected crosspoint for a last data unit of the data packet routed from the selected crosspoint such that the latency counter corresponding to the selected crosspoint indicates the measured latency; and modifying the credit value of the selected crosspoint based on the measured latency for reducing variance among latencies of data packets subsequently routed through the packet switch, wherein the latency for routing the data packet from the selected crosspoint to the destination output port of the data packet is equal to a number of clock cycles of a clock signal spanning a time period for routing the data packet from the selected crosspoint to the destination output port of the data packet.

14. The method of claim 13, further comprising:

routing a plurality of data packets from corresponding crosspoints of the switch fabric to corresponding destination output ports of the packet switch at a same bandwidth;

measuring a latency for routing each data packet of the plurality of data packets from the corresponding crosspoint to the corresponding destination output port, wherein the measured latencies for routing the plurality of data packets from the corresponding crosspoints to the corresponding output ports are different from each other; and modifying the credit value of the crosspoints corresponding to the plurality of data packets based on the measured latencies of the plurality of data packets for reducing variance among latencies of data packets subsequently routed through the packet switch.

15. The method of claim 13, wherein the switch fabric includes a buffered crossbar.

16. The method of claim 13, wherein modifying the credit value of the selected crosspoint comprises decrementing the credit value of the selected crosspoint by the number of clock cycles of the clock signal spanning the time period for routing the data packet from the selected crosspoint to the destination output port of the data packet.

17. The method of claim 13, wherein routing the data packet from the selected crosspoint to the destination output port of the data packet comprises routing the data packet to the destination output port of the data packet as an atomic unit.

18. The method of claim 13, further comprising selecting input bandwidths of the plurality of input ports so that at least two input ports of the plurality of input ports have different input bandwidths.

* * * * *

UNITED STATES PATENT AND TRADEMARK OFFICE
CERTIFICATE OF CORRECTION

PATENT NO.         : 8,014,288 B1                                    Page 1 of 1
APPLICATION NO.    : 12/266377
DATED              : September 6, 2011
INVENTOR(S)        : Angus David Starr MacAdam It is certified that error appears in the above-identified patent and that said Letters Patent is hereby corrected as shown below:

IN THE CLAIMS:

Column 20, claim 1, line 5, delete "at the input bandwidth of the input port".

Signed and Sealed this
Twenty-seventh Day of March, 2012

David J. Kappos
*Director of the United States Patent and Trademark Office*

UNITED STATES PATENT AND TRADEMARK OFFICE
CERTIFICATE OF CORRECTION

PATENT NO.         : 8,014,288 B1
APPLICATION NO.    : 12/266377
DATED              : September 6, 2011
INVENTOR(S)        : Angus David Starr MacAdam Page 1 of 1

It is certified that error appears in the above-identified patent and that said Letters Patent is hereby corrected as shown below:

IN THE CLAIMS:

Column 20, line 65 (claim 1, line 5) delete "at the input bandwidth of the input port".

This certificate supersedes the Certificate of Correction issued March 27, 2012.

Signed and Sealed this
Seventeenth Day of April, 2012

David J. Kappos
*Director of the United States Patent and Trademark Office*